(12) United States Patent
Mu et al.

(10) Patent No.: US 12,153,267 B2
(45) Date of Patent: *Nov. 26, 2024

(54) OPTICAL MODULE

(71) Applicant: Hisense Broadband Multimedia Technologies Co., Ltd., Shandong (CN)

(72) Inventors: Jianwei Mu, Shandong (CN); Tao Wu, Shandong (CN); Sigeng Yang, Shandong (CN); Peng He, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 119 days.

This patent is subject to a terminal disclaimer.

(21) Appl. No.: 17/957,070

(22) Filed: Sep. 30, 2022

(65) Prior Publication Data

US 2023/0418006 A1 Dec. 28, 2023

(30) Foreign Application Priority Data

Jun. 24, 2022 (CN) .......................... 202210730675.6

(51) Int. Cl.
*G02B 6/42* (2006.01)
*H04B 10/25* (2013.01)
(52) U.S. Cl.
CPC ........... *G02B 6/4246* (2013.01); *G02B 6/425* (2013.01); *H04B 10/25* (2013.01)
(58) Field of Classification Search
CPC .. H04B 10/2581; H04B 10/503; H04B 10/67; H04B 10/801; H04B 10/25;
(Continued)

(56) References Cited

U.S. PATENT DOCUMENTS 6,939,058 B2 9/2005 Gurevich et al.
7,371,014 B2 5/2008 Willis et al.
(Continued)

FOREIGN PATENT DOCUMENTS

CN 205725786 U 11/2016
CN 107682084 A 2/2018
(Continued)

OTHER PUBLICATIONS

Office Action issued on May 24, 2023 in Chinese Patent Application No. 202210731028.7 with English translation.
(Continued)

*Primary Examiner* — Pranesh K Barua
(74) *Attorney, Agent, or Firm* — Morgan, Lewis & Bockius LLP

(57) ABSTRACT

An optical module includes a circuit board, a light transmit-receive device and a data processor. The light transmit-receive device includes a first laser array, a first detector array and a first lens assembly. The first laser array is disposed on the circuit board, and is configured to emit a plurality of channels of optical signals driven by the plurality of channels of low-speed electrical signals. The first detector array is disposed on the circuit board, and is configured to receive the plurality of channels of optical signals from outside of the optical module, and convert the plurality of channels of optical signals into a plurality of channels of electrical signals. The first lens assembly covers the first laser array and the first detector array, and is configured to change a propagation direction of optical signals incident into inside of the first lens assembly.

13 Claims, 14 Drawing Sheets

(58) Field of Classification Search
CPC ...... G02B 6/4206; G02B 6/423; G02B 6/425;
G02B 6/4274; G02B 6/4279; G02B
6/4296; G02B 6/4246
See application file for complete search history.

(56) References Cited

U.S. PATENT DOCUMENTS

| | | | |
|---|---|---|---|
| 7,399,125 | B1 | 7/2008 | Whaley et al. |
| 7,539,367 | B2 | 5/2009 | Tamura et al. |
| 8,262,297 | B2 | 9/2012 | Castanga et al. |
| 8,534,928 | B2 | 9/2013 | Cooke et al. |
| 8,967,886 | B2 | 3/2015 | Kuo et al. |
| 8,985,865 | B2 | 3/2015 | Howard et al. |
| 9,011,024 | B2 | 4/2015 | Chen et al. |
| 9,134,487 | B2 | 9/2015 | Chang et al. |
| 9,140,866 | B2 | 9/2015 | Lee et al. |
| 9,465,176 | B2 | 10/2016 | Pommer et al. |
| 9,606,305 | B1 | 3/2017 | Yu et al. |
| 9,645,331 | B1 | 5/2017 | Kim |
| 9,971,109 | B1 | 5/2018 | Wu et al. |
| 10,151,891 | B1 | 12/2018 | Lin |
| 10,568,238 | B1 | 2/2020 | Leung et al. |
| 10,659,854 | B1 | 5/2020 | Alfiad et al. |
| 10,826,613 | B1* | 11/2020 | Liang .................... G02B 6/425 |
| 10,976,510 | B2 | 4/2021 | Kon |
| 11,018,709 | B2 | 5/2021 | Lam et al. |
| 11,165,509 | B1* | 11/2021 | Nagarajan ............... H04B 10/40 |
| 11,218,186 | B2 | 1/2022 | Lin et al. |
| 11,336,374 | B1 | 5/2022 | Gridish et al. |
| 11,409,060 | B2 | 8/2022 | Kon |
| 11,418,262 | B2 | 8/2022 | Han et al. |
| 11,811,452 | B2* | 11/2023 | Sun ........................ H04B 10/66 |
| 2008/0226228 | A1 | 9/2008 | Tamura et al. |
| 2009/0148155 | A1 | 6/2009 | Latchman |
| 2012/0008899 | A1 | 1/2012 | Morioka |
| 2012/0263416 | A1 | 10/2012 | Morioka |
| 2013/0287394 | A1 | 10/2013 | Chaahoub et al. |
| 2013/0287404 | A1* | 10/2013 | McColloch .......... G02B 6/4246 439/78 |
| 2014/0010546 | A1* | 1/2014 | Chaahoub ............... G06F 13/00 398/116 |
| 2014/0348512 | A1* | 11/2014 | Chaahoub ............ H04B 10/801 398/139 |
| 2014/0369347 | A1 | 12/2014 | Orsley |
| 2014/0369651 | A1 | 12/2014 | David et al. |
| 2015/0016786 | A1 | 1/2015 | Chang et al. |
| 2015/0362685 | A1 | 12/2015 | Shah |
| 2015/0365177 | A1* | 12/2015 | Blumenthal ........... H04B 10/40 398/9 |
| 2016/0246019 | A1 | 8/2016 | Ishii et al. |
| 2016/0266340 | A1* | 9/2016 | Zhang .................. G02B 6/4284 |
| 2017/0099101 | A1* | 4/2017 | Pepper ................. H04B 10/801 |
| 2017/0127157 | A1 | 5/2017 | Frankel et al. |
| 2018/0031789 | A1 | 2/2018 | Kurashima et al. |
| 2018/0295737 | A1 | 10/2018 | Balasubramanian et al. |
| 2019/0199439 | A1 | 6/2019 | Zuo et al. |
| 2020/0168655 | A1 | 5/2020 | Wang et al. |
| 2020/0280329 | A1 | 9/2020 | Lam et al. |
| 2020/0280458 | A1 | 9/2020 | Lam et al. |
| 2020/0287629 | A1* | 9/2020 | Han ........................ H04B 10/40 |
| 2021/0124125 | A1 | 4/2021 | Lysdal et al. |
| 2021/0273678 | A1 | 9/2021 | Lin et al. |
| 2022/0159013 | A1 | 5/2022 | Zimmerman et al. |
| 2022/0321218 | A1 | 10/2022 | Sun et al. |
| 2023/0043794 | A1 | 2/2023 | Johannes et al. |
| 2023/0418006 | A1 | 12/2023 | Mu et al. |
| 2023/0421262 | A1 | 12/2023 | Mu et al. |

FOREIGN PATENT DOCUMENTS

| | | | |
|---|---|---|---|
| CN | 109617610 | A | 4/2019 |
| CN | 113009654 | A | 6/2021 |
| CN | 114296191 | A | 4/2022 |
| CN | 114371536 | A | 4/2022 |
| CN | 114384642 | A | 4/2022 |
| CN | 114647030 | A | 6/2022 |
| CN | 114879324 | A | 8/2022 |
| CN | 114994839 | A | 9/2022 |
| CN | 115079356 | A | 9/2022 |
| WO | 2021/115454 | A1 | 6/2021 |
| WO | 2022/083041 | A1 | 4/2022 |

OTHER PUBLICATIONS

International Search Report and Written Opinion issued in corresponding International Patent Application No. PCT/CN2022/131779, dated Mar. 20, 2023 with English translation.

Office Action issued on Jan. 19, 2024 in U.S. Appl. No. 17/956,084.

* cited by examiner

OPTICAL MODULE

CROSS-REFERENCE TO RELATED APPLICATION

This application claims benefit and priority to Chinese Patent Application No. 202210730675.6, filed on Jun. 24, 2022, which is incorporated herein by reference in its entirety.

TECHNICAL FIELD

The present disclosure relates to the field of optical communication technologies, and in particular, to an optical module.

BACKGROUND

Driven by providers of hyperscale cloud data centers, advances in signal technology and transceiver technology drive development of next-generation transmission speeds. A transmission rate of pluggable optical modules is rapidly increasing, such as 1.6 Tb/s or 3.2 Tb/s, which has gradually become focus of the industry.

SUMMARY

An optical module is provided. An optical module includes a circuit board, a light transmit-receive device and a data processor. The light transmit-receive device is disposed on the circuit board, and is configured to emit a plurality of channels of first optical signals, receive a plurality of channels of second optical signals from outside of the optical module, and convert the plurality of channels of second optical signals into a plurality of channels of electrical signals. The data processor is disposed on the circuit board, and includes a reverse gearbox and a gearbox. The reverse gearbox is connected to the light transmit-receive device, and is configured to receive a first high-speed electrical signal from the circuit board, decode the first high-speed electrical signal into a plurality of channels of first low-speed electrical signals, and the plurality of channels of first low-speed electrical signals drive the light transmit-receive device to emit the plurality of channels of first optical signals. The gearbox is connected to the light transmit-receive device, and is configured to receive a plurality of channels of second low-speed electrical signals output by the light transmit-receive device, encode the plurality of channels of second low-speed electrical signals into a second high-speed electrical signal, and transmit the second high-speed electrical signal to the circuit board. The light transmit-receive device includes a first laser array, a first detector array and a first lens assembly. The first laser array is disposed on the circuit board, and is configured to emit the plurality of channels of first optical signals driven by the plurality of channels of first low-speed electrical signals. The first detector array is disposed on the circuit board, and is configured to receive the plurality of channels of second optical signals from outside of the optical module, and convert the plurality of channels of second optical signals into the plurality of channels of electrical signals. The first lens assembly covers the first laser array and the first detector array, and is configured to change a propagation direction of optical signals incident into inside of the first lens assembly.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

DETAILED DESCRIPTION

Figure 1:
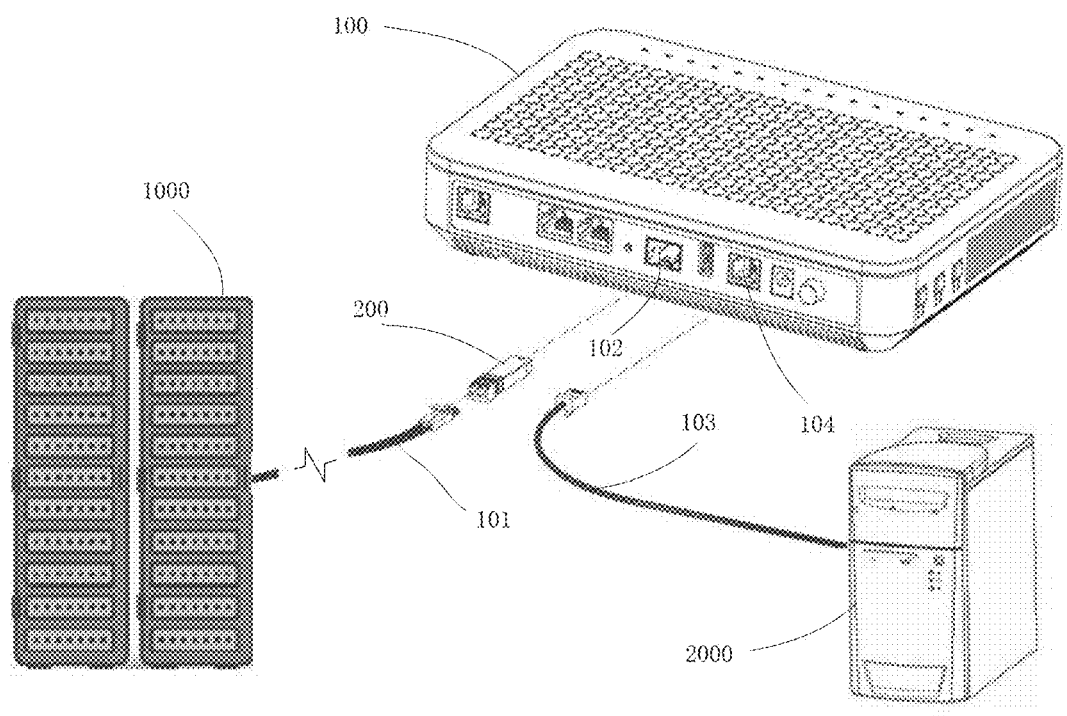
FIG. 1 is a diagram showing a connection relationship of an optical communication system, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, specific features, structures, materials, or characteristics described herein may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more features. In the description of the embodiments of the present disclosure, terms "a plurality of" "the plurality of" and "multiple" each mean two or more unless otherwise specified.

In the description of the embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein has an open and inclusive meaning, which does not exclude devices that are applicable to or configured to perform additional tasks or steps.

As used herein, terms such as "about", "substantially" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In an optical communication system, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, since a signal transmitted by the information transmission device such as the optical fiber or the optical waveguide is an optical signal, and a signal that may be recognized and processed by the information processing device such as a computer is an electrical signal, in order to establish information connection between the information transmission device such as the optical fiber or the optical waveguide and the information processing device such as the computer, there is a need to achieve interconversion between the electrical signal and the optical signal.

In the field of optical communication technology, an optical module may achieve the interconversion between the optical signal and the electrical signal. The optical module includes an optical port and an electrical port. The optical module achieves optical communication with the information transmission device such as the optical fiber or the optical waveguide through the optical port, and achieves electrical connection with an optical network terminal (e.g., an optical modem) through the electrical port. The electrical connection is mainly used for power supply, inter-integrated circuit (I2C) signal transmission, data information transmission, grounding and the like. The optical network terminal transmits the electrical signal to the information processing device such as the computer through a network cable or wireless fidelity (Wi-Fi).

FIG. 1 is a diagram showing a connection relationship of an optical communication system. As shown in FIG. 1, the optical communication system includes a remote server

1000, a local information processing device 2000, an optical network terminal 100, an optical module 200, an external optical fiber 101 and a network cable 103.

One end of the external optical fiber 101 is connected to the remote server 1000, and another end of the external optical fiber 101 is connected to the optical network terminal 100 through the optical module 200. An optical fiber itself may support long-distance signal transmission, such as signal transmission over several kilometers (6 kilometers to 8 kilometers). On this basis, if a repeater is used, in theory, infinite distance transmission may be realized. Therefore, in a typical optical communication system, a distance between the remote server 1000 and the optical network terminal 100 may typically reach several kilometers, dozens of kilometers, or hundreds of kilometers.

One end of the network cable 103 is connected to the local information processing device 2000, and another end of the network cable 103 is connected to the optical network terminal 100. The local information processing device 2000 includes one or more of a router, a switch, a computer, a mobile phone, a tablet computer and a television.

A physical distance between the remote server 1000 and the optical network terminal 100 is greater than a physical distance between the local information processing device 2000 and the optical network terminal 100. Connection between the local information processing device 2000 and the remote server 1000 is completed by the external optical fiber 101 and the network cable 103, and connection between the external optical fiber 101 and the network cable 103 is completed by the optical module 200 and the optical network terminal 100.

The optical module 200 includes an optical port and an electrical port. The optical port is configured to connect to the external optical fiber 101, so that bidirectional optical signal connection is established between the optical module 200 and the external optical fiber 101. The electrical port is configured to connect to the optical network terminal 100, so that bidirectional electrical signal connection is established between the optical module 200 and the optical network terminal 100. Interconversion between the optical signal and the electrical signal is achieved by the optical module 200, so that information connection between the external optical fiber 101 and the optical network terminal 100 is established. For example, an optical signal from the external optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the external optical fiber 101. Since the optical module 200 is a tool for achieving the interconversion between the optical signal and the electrical signal, and doesn't have a data processing function, the information doesn't change in the photoelectric conversion process described above.

The optical network terminal 100 includes a housing in a substantially cuboid shape, and an optical module interface 102 and a network cable interface 104 that are disposed on the housing. The optical module interface 102 is configured to connect to the optical module 200, so that the bidirectional electrical signal connection between the optical network terminal 100 and the optical module 200 is established. The network cable interface 104 is configured to connect to the network cable 103, so that bidirectional electrical signal connection between the optical network terminal 100 and the network cable 103 is established. Connection between the optical module 200 and the network cable 103 is established through the optical network terminal 100. For example, the optical network terminal 100 transmits the electrical signal from the optical module 200 to the network cable 103, and transmits the electrical signal from the network cable 103 to the optical module 200. Therefore, the optical network terminal 100, as a master monitor of the optical module 200, may monitor an operation of the optical module 200. In addition to the optical network terminal 100, the master monitor of the optical module 200 may further includes an optical line terminal (OLT).

A bidirectional signal transmission channel is established between the remote server 1000 and the local information processing device 2000 through the external optical fiber 101, the optical module 200, the optical network terminal 100 and the network cable 103.

Figure 2:
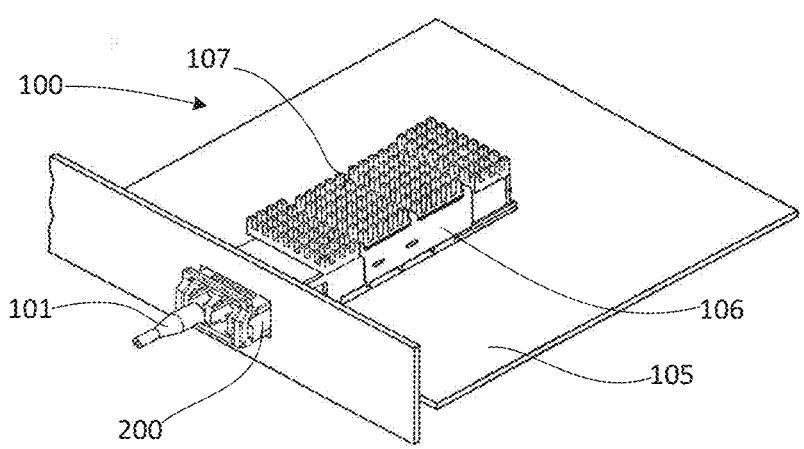
FIG. 2 is a structural diagram of an optical network terminal, in accordance with some embodiments.

FIG. 2 is a structural diagram of an optical network terminal. In order to clearly show a connection relationship between the optical module 200 and the optical network terminal 100, FIG. 2 only shows structures of the optical network terminal 100 that are related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to connect to the electrical port of the optical module 200, and the heat sink 107 has protruding portions such as fins for increasing a heat dissipation area.

The optical module 200 is inserted into the cage 106 of the optical network terminal 100, and the optical module 200 is fixed by the cage 106. Heat generated by the optical module 200 is conducted to the cage 106, and then is dissipated through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module 200 is connected to the external optical fiber 101, so that the bidirectional optical signal connection between the optical module 200 and the external optical fiber 101 is established.

Figure 3:
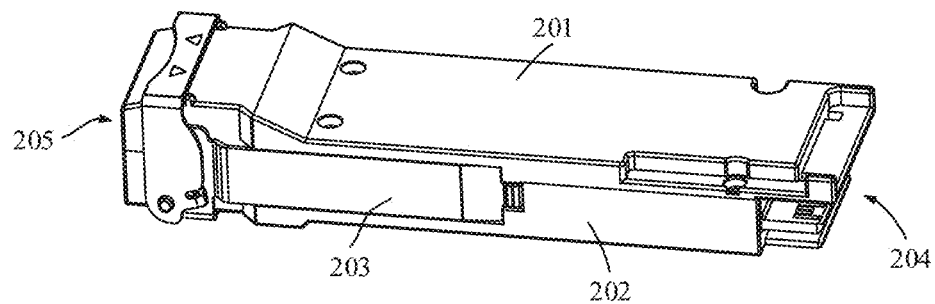
FIG. 3 is a structural diagram of an optical module, in accordance with some embodiments.
Figure 4:
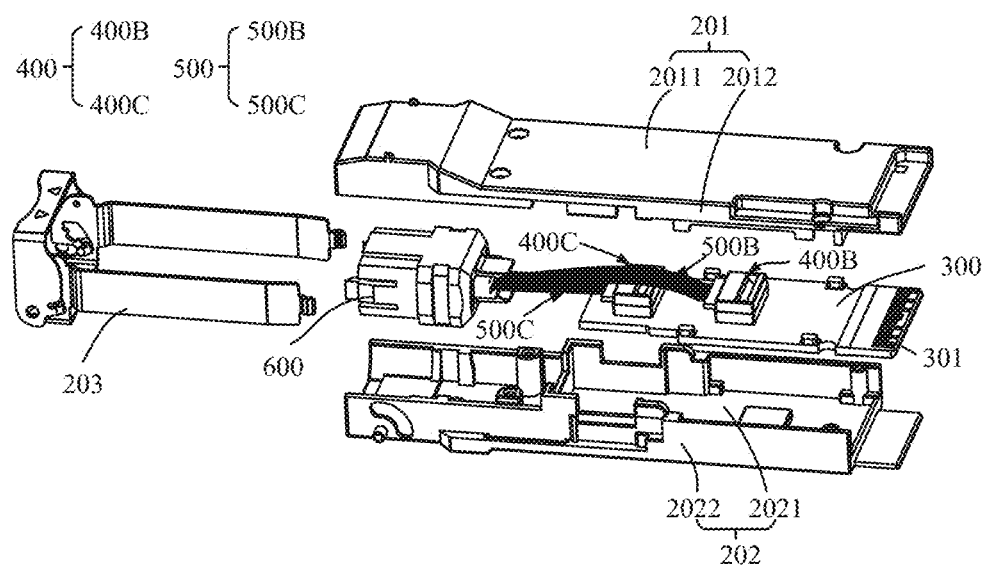
FIG. 4 is an exploded view of an optical module, in accordance with some embodiments.

FIG. 3 is a structural diagram of an optical module, in accordance with some embodiments, and FIG. 4 is an exploded view of an optical module, in accordance with some embodiments. As shown in FIGS. 3 and 4, the optical module 200 includes a shell, a circuit board 300 disposed in the shell and a light transmit-receive assembly 400 disposed on the circuit board 300.

The shell includes an upper shell 201 and a lower shell 202, and the upper shell 201 covers the lower shell 202 to form the shell having two openings. An outer contour of the shell is generally in a cuboid shape.

In some embodiments of the present disclosure, the lower shell 202 includes a bottom plate 2021 and two lower side plates 2022 that are located on two sides of the bottom plate 2021 respectively and disposed perpendicular to the bottom plate 2021. The upper shell 201 includes a cover plate 2011, and the cover plate 2011 covers the two lower side plates 2022 of the lower shell 202 to form the shell.

In some embodiments, the lower shell 202 includes a bottom plate 2021 and two lower side plates that are located on two sides of the bottom plate 2021 respectively and disposed perpendicular to the bottom plate 2021. The upper shell 201 includes a cover plate 2011 and two upper side plates that are located on two sides of the cover plate 2011 respectively and disposed perpendicular to the cover plate 2011. The two upper side plates 2012 are combined with the two lower side plates 2022 respectively, so that the upper shell 201 covers the lower shell 202.

A direction in which a connection line between the two openings 204 and 205 extends may be the same as a length direction of the optical module 200, or may not be the same as the length direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located at a side of the optical module 200. The opening 204 is an electrical port, a connecting finger 301 of the circuit board 300 protrudes from the electrical port, and is inserted into the master monitor (e.g., the optical network terminal 100). The opening 205 is an optical port, and is configured to connect to the external optical fiber 101, so that the external optical fiber 101 is connected to the light transmit-receive assembly 400 inside the optical module 200.

By adopting an assembly mode of combining the upper shell 201 with the lower shell 202, it is possible to facilitate installation of devices such as the circuit board 300 and the light transmit-receive assembly 400 into the shell, and the upper shell 201 and the lower shell 202 may provide encapsulation and protection for these devices. In addition, in a case where devices such as the circuit board 300 and the light transmit-receive assembly 400 are assembled, it is possible to facilitate an arrangement of positioning components, heat dissipation components and electromagnetic shielding components of these devices, which is conducive to implementation of automated production.

In some embodiments, the upper shell 201 and the lower shell 202 are generally made of a metal material, which is conducive to electromagnetic shielding and heat dissipation.

In some embodiments, the optical module 200 further includes an unlocking component 203 located outside the shell thereof, and the unlocking component 203 is configured to implement a fixed connection between the optical module 200 and the master monitor, or to release a fixed connection between the optical module 200 and the master monitor.

For example, the unlocking component 203 is located on outer walls of the two lower side plates 2022 of the lower shell 202, and has an engagement element that is matched with the cage of the master monitor (e.g., the cage 106 of the optical network terminal 100). In a case where the optical module 200 is inserted into the cage of the master monitor, the engagement element of the unlocking component 203 fixes the optical module 200 in the cage of the master monitor. When the unlocking component 203 is pulled, the engagement element of the unlocking component 203 moves along with the unlocking component 203, and then a connection relationship between the engagement element and the master monitor is changed to release the engagement between the optical module 200 and the master monitor, so that the optical module 200 may be pulled out of the cage of the master monitor.

The circuit board 300 includes circuit traces, electronic elements and chips. Through the circuit traces, the electronic elements and chips are connected together according to a circuit design, so as to implement functions such as power supply, transmission of an electrical signal, and grounding. The electronic elements include, for example, capacitors, resistors, triodes, and metal-oxide-semiconductor field-effect transistors (MOSFETs). The chips include, for example, a microcontroller unit (MCU), a clock data recovery (CDR) chip, and a power management chip.

The circuit board 300 is generally a rigid circuit board, and the rigid circuit board may also implement a support function due to its relatively hard material. For example, the rigid circuit board may stably support the electronic elements and the chips. In the case where the light transmit-receive assembly 400 is located on the circuit board 300, the rigid circuit board may also provide stable support for the light transmit-receive assembly 400. The rigid circuit board may also be inserted into the electrical connector in the cage of the master monitor.

The circuit board 300 further includes the connecting finger 301 formed on an end surface thereof, and the connecting finger 301 is composed of a plurality of independent pins. The circuit board 300 is inserted into the cage 106, and is conductively connected to the electrical connector in the cage 106 through the connecting finger 301. The connecting finger 301 may be disposed on only one surface (e.g., an upper surface shown in FIG. 4) of the circuit board 300, or may be disposed on both upper and lower surfaces of the circuit board 300 to adapt to an occasion where a large number of pins are needed. The connecting finger 301 is configured to establish electrical connection with the master monitor, so as to implement functions such as power supply, grounding, I2C signal transmission, and data signal transmission.

Of course, flexible circuit boards are also used in some optical modules. A flexible circuit board is generally used in conjunction with a rigid circuit board as a supplement for the rigid circuit board. For example, the rigid circuit board is connected to the light transmit-receive assembly 400 through the flexible circuit board.

As shown in FIG. 4, the optical module 200 further includes an optical fiber array 500 and an optical fiber adapter 600. The optical fiber adapter 600 is configured to be connected to the external optical fiber 101. One end of the optical fiber array 500 is connected to the light transmit-receive assembly 400, and another end of the optical fiber array 500 is connected to the optical fiber adapter 600, so that the light transmit-receive assembly 400 is connected to the external optical fiber 101 through the optical fiber array 500 and the optical fiber adapter 600.

An optical signal emitted by the light transmit-receive assembly 400 is transmitted to the external optical fiber 101 through the optical fiber array 500 and the optical fiber adapter 600, and an optical signal transmitted by the external optical fiber 101 is transmitted to the light transmit-receive assembly 400 through the optical fiber adapter 600 and the optical fiber array 500, so that the light transmit-receive assembly 400 outputs the optical signal to the external optical fiber 101 or receives the optical signal from the external optical fiber 101.

The light transmit-receive assembly 400 includes light emitting chips configured to emit optical signals. In some embodiments, a light emitting chip may be a silicon photonic chip, an electro-absorption modulated laser (EML), a directly modulated laser (DML), or a vertical cavity surface emitting laser (VCSEL).

A light emitting surface of the VCSEL is a top surface (i.e., a surface facing away from the circuit board 300) thereof, and a plurality of VCSELs may be integrated in an array. Since an integration degree of the VCSELs is much higher than an integration degree of other types of light sources, it is easier to achieve miniaturization. In addition, a driving current of the VCSEL is in a range of 7 mA to 10 mA inclusive, and a driving current of the EML is 80 mA.

In this way, the driving current of the VCSEL is much less than driving currents of other types of light sources, and the VCSEL adopts a direct modulation method, which makes its power consumption low, and it is easy to achieve an overall power consumption target of the optical module. It will be seen that, the VCSEL has significant characteristics such as low cost and low power consumption. Therefore, the following descriptions are given by considering an example in which the light emitting chip is the VCSEL.

The light transmit-receive assembly 400 further includes light receiving chips configured to receive optical signals and convert the optical signals into electrical signals. In some embodiments, the light receiving chip may be a photodiode, or a detector. A light incident surface of the detector is a top surface (i.e., a surface facing away from the circuit board 300) thereof, and the optical signal transmitted by the external optical fiber 101 is incident into the detector in a direction perpendicular to the top surface, so that a plurality of detectors may be integrated in an array, and it is easy to achieve miniaturization. Therefore, the following descriptions are given by considering an example in which the light receiving chip is a detector.

In a current optical module, due to high requirements of electrical signals on circuits, a transmission rate (electrical port rate) of a single channel of electric signal is relatively small. Since an optical port rate is generally greater than or equal to the electrical port rate, it is generally necessary to superimpose a plurality of channels of electrical signals, so that a transmission rate of a superimposed electrical signal is equal to a transmission rate of an optical signal. Thus, the number of electrical channels is generally greater than the number of optical channels.

For example, in a case where the optical port rate is 100 Gb/s, the electrical port rate may be 100 Gb/s, and in this case, the number of electrical channels is the same as the number of optical channels. The electrical port rate may also be 50 Gb/s, and in this case, the number of electrical channels is twice that of the optical channels, and an electrical port rate after superposition of the two electrical channels is equal to the optical port rate. The electrical port rate may also be 25 Gb/s, and in this case, the number of electrical channels is four times that of the optical channels, and an electrical port rate after superposition of the four electrical channels is equal to the optical port rate.

However, driven by providers of hyperscale cloud data centers, advances in signal technology and transceiver technology drive development of next-generation transmission speeds, and a transmission rate of pluggable optical modules is rapidly increasing. Recently, optical modules with a transmission rate of 1.6 Tb/s or 3.2 Tb/s have gradually become the focus of the industry. In this case, the transmission rate of the electrical port is greatly improved, and the transmission rate of the single channel of electrical signal may reach 200 Gb/s. The optical module based on the VCSEL has reached a bandwidth limit thereof in the case where the optical port rate is 100 Gb/s, and in this case, the electrical port rate is greater than the optical port rate.

In order to drive the VCSEL with the optical port rate of 100 Gb/s, it is necessary to reduce the electrical port rate, so as to make the electrical port rate for driving the VCSEL be equal to or less than 100 Gb/s. In some embodiments of the present disclosure, a single channel of electrical signal with a transmission rate of 200 Gb/s is divided into two channels of electrical signals each with a transmission rate of 100 Gb/s, so as to drive the VCSEL with the optical port rate of 100 Gb/s.

Figure 5:
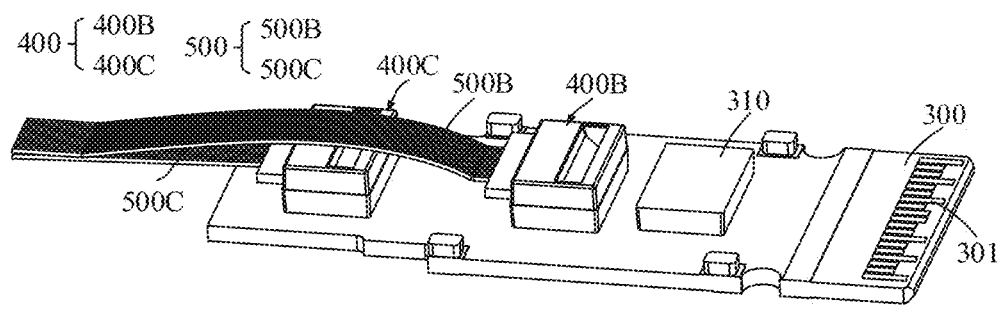
FIG. 5 is an assembly diagram of a circuit board, a light emitting device, and a light receiving device in an optical module, in accordance with some embodiments.
Figure 6:
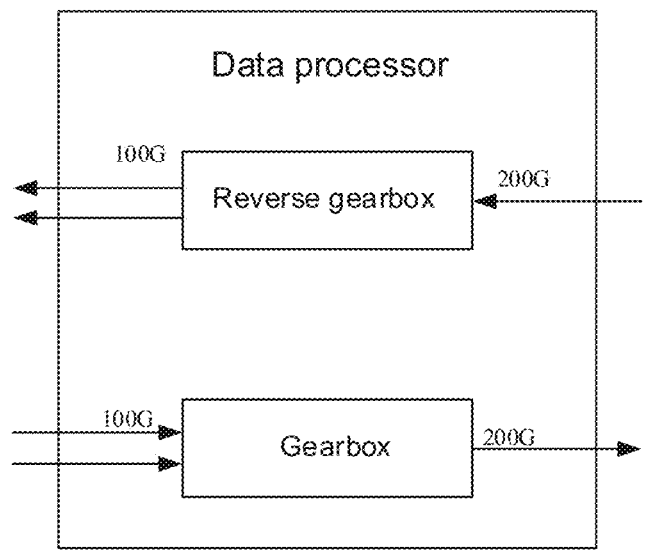
FIG. 6 is a schematic diagram of a data processor in an optical module, in accordance with some embodiments.

FIG. 5 is an assembly diagram of a circuit board, a light receiving device, and a light emitting device in an optical module, in accordance with some embodiments, and FIG. 6 is a schematic diagram of a data processor in an optical module, in accordance with some embodiments. As shown in FIGS. 5 and 6, the optical module 200 further includes a data processor 310 disposed on the circuit board 300, and the data processor is electrically connected to the light emitting chip and the light receiving chip. In this way, an electrical signal output by the data processor 310 may drive the light emitting chip to emit an optical signal. The optical signal transmitted by the external optical fiber 101 is incident on the light receiving chip, the light receiving chip converts the optical signal into an electrical signal, and the electrical signal is transmitted to the data processor 310. In some embodiments, the data processor 310 may be a digital signal processing (DSP) chip.

The data processor 310 includes a reverse gearbox electrically connected to the connecting finger 301 and the light emitting chip. In this way, the electrical signal transmitted by the master monitor is transmitted to the reverse gearbox through the connecting finger 301, and the reverse gearbox decodes the received electrical signal to reduce a transmission rate of the electrical signal. For example, the reverse gearbox may decode one channel of high-speed electrical signal into two channels of low-speed electrical signals, and channels of the electrical signal output by the reverse gearbox are twice the channels of the electrical signal input to the reverse gearbox. Each channel of electrical signal output by the reverse gearbox corresponds to a light emitting chip, and the light emitting chip converts one channel of electrical signal output by the reverse gearbox into an optical signal. For example, the connecting finger 301 transmits the electrical signal input by the master monitor to the reverse gearbox at a transmission rate of 200 Gb/s, and the reverse gearbox may decode one channel of high-speed electrical signal with a transmission rate of 200 Gb/s into two channels of low-speed electrical signal each with a transmission rate of 100 Gb/s.

The light emitting chip with an optical port rate of 100 Gb/s emits an optical signal driven by the low-speed electrical signal with a transmission rate of 100 Gb/s, which solves a problem that the limit transmission bandwidth of the light emitting chip can't match a transmission rate of a high-speed electrical signal in a case where the transmission rate of the high-speed electrical signal is 200 Gb/s.

The data processor 310 further includes a gearbox electrically connected to the connecting finger 301 and the light receiving chip. In this way, the light receiving chip converts optical signals into electrical signals and transmits the electrical signals to the gearbox, and the gearbox encodes the received electrical signals to improve a transmission rate of the electrical signals. For example, each channel of electrical signal input to the gearbox corresponds to a light receiving chip, and an electrical signal output by the light receiving chip is transmitted to the gearbox. The gearbox may encode two channels of low-speed electrical signals into one channel of high-speed electrical signal, and channels of electrical signals output by the gearbox are half of channels of electrical signals input to the gearbox. For example, the electrical signal output by the light receiving chip is transmitted to the gearbox at a transmission rate of 100 Gb/s, and the gearbox may encode two channels of low-speed electrical signals each with a transmission rate of 100 Gb/s into one channel of high-speed electrical signal with a transmission rate of 200 Gb/s.

Figure 7:
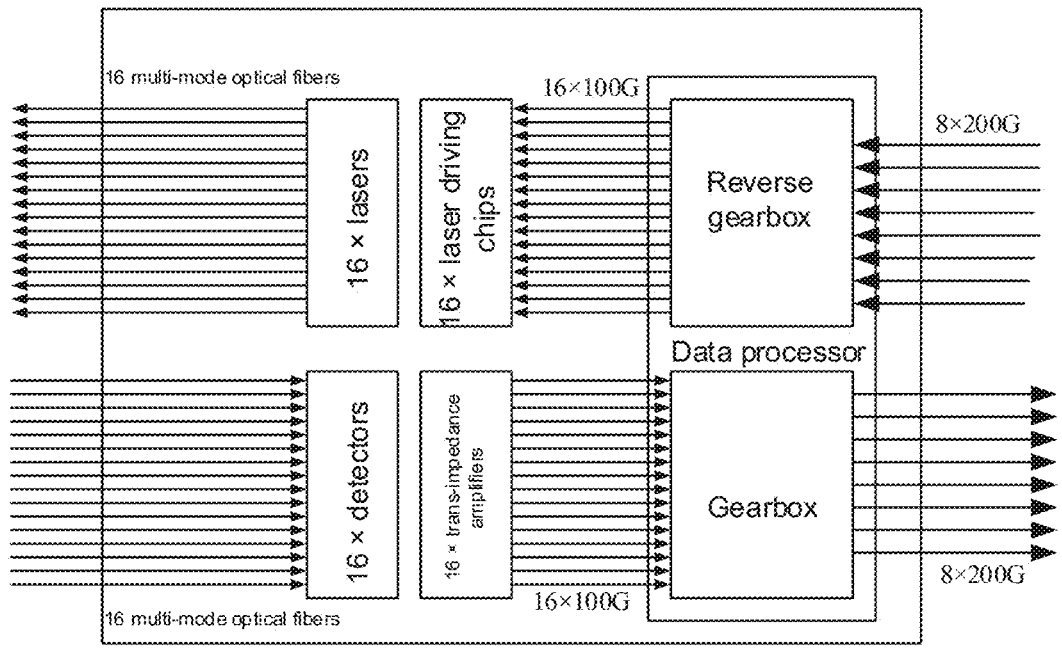
FIG. 7 is a schematic diagram of a data processor, a light emitting device, and a light receiving device in an optical module, in accordance with some embodiments.
Figure 8:
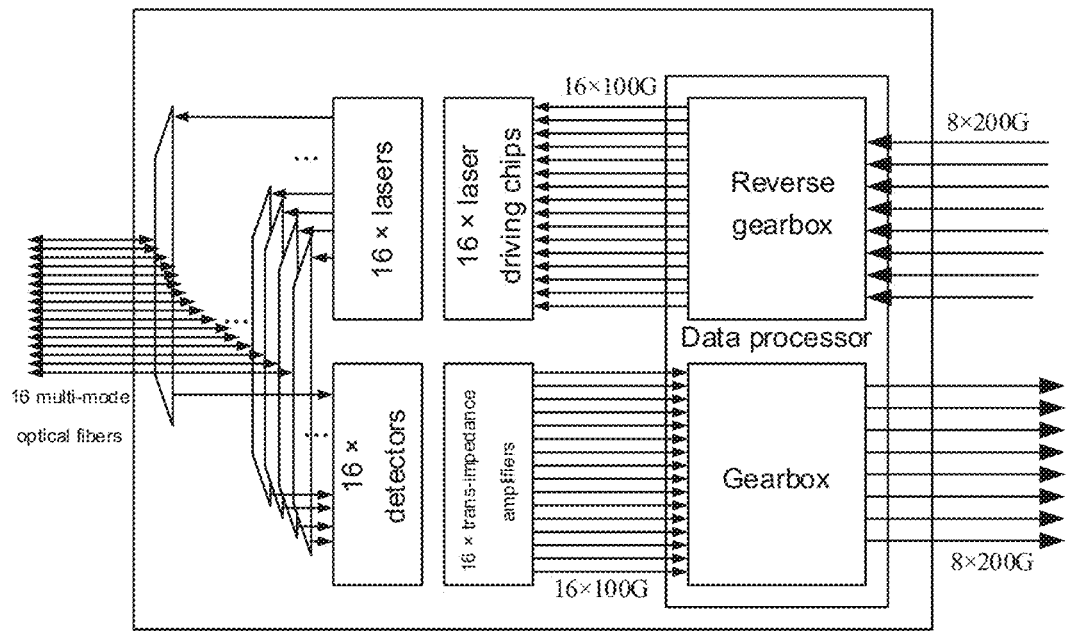
FIG. 8 is a schematic diagram of a data processor and a light transmit-receive device in an optical module, in accordance with some embodiments.

FIG. 7 is a schematic diagram of a data processor, a light emitting device, and a light receiving device in an optical module, in accordance with some embodiments. FIG. 8 is a schematic diagram of a data processor and a light transmit-receive device in an optical module, in accordance with some embodiments. As shown in FIGS. 7 and 8, the light transmit-receive assembly 400 further includes laser driving chips and trans-impedance amplifiers. A laser driving chip is configured to drive a light emitting chip to emit an optical signal, and a trans-impedance amplifier is configured to amplify an electrical signal converted by a light receiving chip.

In order to achieve signal transmission of 1.6 Tb/s in the case where the electrical signal transmission rate is 200 Gb/s, 8 channels of 4-level pulse amplitude modulation (PAM4) electrical signals each with a transmission rate of 200 Gb/s are input from the electrical port 204 of the optical module 200 through the connecting finger 301, and the 8 channels of PAM4 electrical signals each with a transmission rate of 200 Gb/s are decoded into 16 channels of PAM4 electrical signals each with a transmission rate of 100 Gb/s by the reverse gearbox of the data processor 310. The 16 channels of PAM4 electrical signals each with a transmission rate of 100 Gb/s drive 16 VCSELs to generate 16 channels of optical signals, after processed by 16 laser driving chips. The 16 channels of optical signals are incident into a multi-mode optical fiber array with 16 channels through mature multi-mode optical fiber coupling technology, and are emitted through the multi-mode optical fiber array with 16 channels. Thus, light emission is achieved.

The 16 channels of optical signals are input from the optical port 205 of the optical module 200 through the multi-mode optical fiber array with 16 channels, and the 16 channels of optical signals are converted into 16 channels of PAM4 electrical signals each with a transmission rate of 100 Gb/s by 16 detectors. The 16 channels of PAM4 electrical signals each with a transmission rate of 100 Gb/s are amplified by 16 trans-impedance amplifiers and then transmitted to the gearbox. The 16 channels of PAM4 electrical signals each with a transmission rate of 100 Gb/s are encoded into 8 channels of PAM4 electrical signals each with a transmission rate of 200 Gb/s by the gearbox, and the 8 channels of PAM4 electrical signals each with a transmission rate of 200 Gb/s are transmitted to the master monitor through the connecting finger 301. Thus, light reception is achieved.

In some embodiments of the present disclosure, a VCSEL laser array is used as an emission source, a detector array is used as a receiving source, and the multi-mode optical fiber array is used as a transmission medium, so that the entire optical system is very simple and a coupling process is easy to achieve. An overall optical target may be achieved by using a single injection-molded part and a passive assembly process, which makes assembly cost and production cost of the optical module much lower than that of a single-mode optical system.

Figure 9:
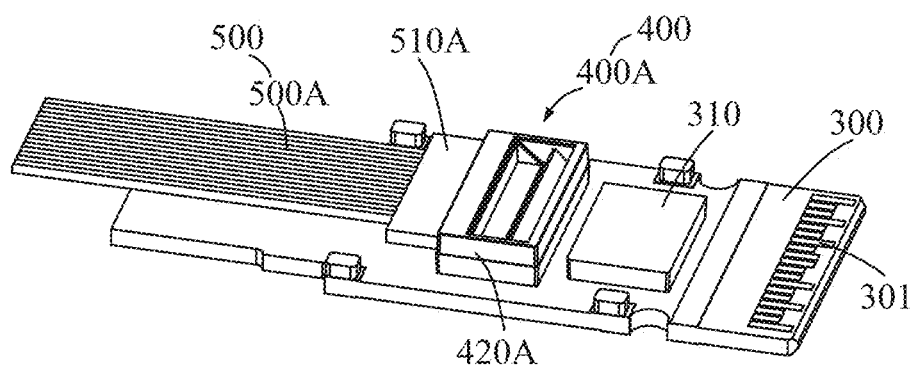
FIG. 9 is an assembly diagram of a circuit board and a light transmit-receive device in an optical module, in accordance with some embodiments.

FIG. 9 is an assembly diagram of a circuit board and a light transmit-receive device in an optical module, in accordance with some embodiments. As shown in FIG. 9, the light transmit-receive assembly 400 includes the light transmit-receive device 400A, and the optical fiber array 500 includes a transmit-receive optical fiber array 500A. One end of the transmit-receive optical fiber array 500A is connected to the light transmit-receive device 400A, and another end of the transmit-receive optical fiber array 500A is connected to the optical fiber adapter 600. The light transmit-receive device 400A is connected to the external optical fiber 101 through the transmit-receive optical fiber array 500A and the optical fiber adapter 600.

Optical signals emitted by the light transmit-receive device 400A are transmitted to the external optical fiber 101 through the transmit-receive optical fiber array 500A and the optical fiber adapter 600, and optical signals transmitted by the external optical fiber 101 are transmitted to the light transmit-receive device 400A through the optical fiber adapter 600 and the transmit-receive optical fiber array 500A, so that the light transmit-receive device 400A may output optical signals to the external optical fiber 101 or receives optical signals from the external optical fiber 101.

Figure 10:
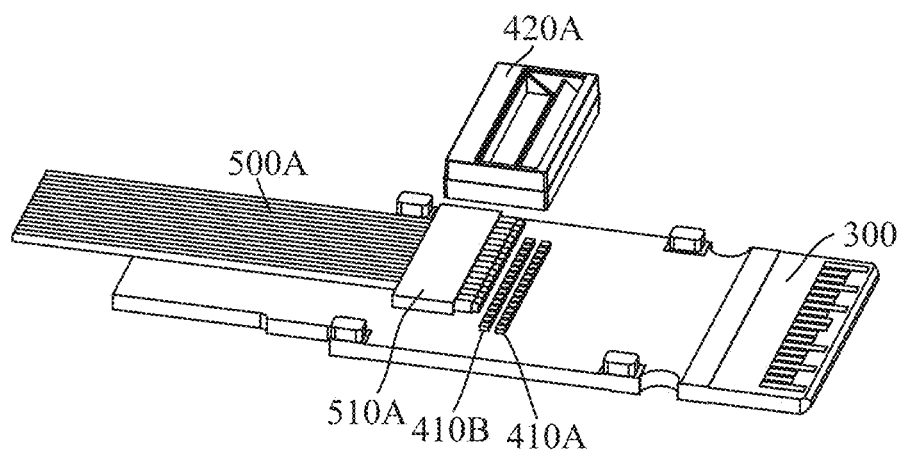
FIG. 10 is an exploded view showing a portion of a circuit board and a light transmit-receive device in an optical module, in accordance with some embodiments.

FIG. 10 is an exploded view showing a portion of a circuit board and a light transmit-receive device in an optical module, in accordance with some embodiments. As shown in FIG. 10, the light transmit-receive device 400A includes a first laser array 410A, a first detector array 410B and a first lens assembly 420A. Both the first laser array 410A and the first detector array 410B are disposed on the circuit board 300 and arranged along the length direction of the circuit board 300, and the first detector array 410B is closer to the optical fiber adapter 600 than the first laser array 410A. For example, the first laser array 410A includes 16 lasers, the 16 lasers are arranged in a row along a width direction of the circuit board 300, and each laser is a VCSEL. The first detector array 410B includes 16 detectors, and the 16 detectors are arranged in a row along the width direction of the circuit board 300.

The first lens assembly 420A is disposed on the circuit board 300 and forms a sealed cavity with the circuit board 300, and the first laser array 410A and the first detector array 410B are located in the sealed cavity. The first lens assembly 420A is connected to an end of the transmit-receive optical fiber array 500A, and is configured to change a propagation direction of optical signals emitted by the first laser array 410A and a propagation direction of the optical signals from the outside of the optical module 200.

The optical signals emitted by the first laser array 410A enter an inside of the first lens assembly 420A, then are reflected by the first lens assembly 420A into the transmit-receive optical fiber array 500A, and finally are transmitted to the external optical fiber 101 through the optical fiber adapter 600. As a result, output of the optical signals to the outside of the optical module 200 is achieved. The optical signals transmitted by the external optical fiber 101 enter the inside of the first lens assembly 420A through the optical fiber adapter 600 and the transmit-receive optical fiber array 500A, and are reflected by the first lens assembly 420A into the first detector array 4106, thereby realizing reception of the optical signals from the outside of the optical module 200. It will be seen that, the first lens assembly 420A not only plays a role of sealing the first laser array 410A and the first detector array 410B, but also establishes optical connection between the first laser array 410A and the transmit-receive optical fiber array 500A, and optical connection between the first detector array 410B and the transmit-receive optical fiber array 500A.

In some embodiments, the light transmit-receive device 400A further includes a plurality of laser driving chips corresponding to the plurality of lasers in the first laser array 410A, and a plurality of trans-impedance amplifiers corresponding to the plurality of detectors in the first detector array 410B. The plurality of laser driving chips and the plurality of trans-impedance amplifiers are all disposed on the circuit board 300 and located in the sealed cavity formed by the first lens assembly 420A and the circuit board 300. A laser driving chip is configured to drive a corresponding laser to emit optical signals, and a trans-impedance amplifier is configured to amplify electrical signals converted by a corresponding detector. For example, the light transmit-receive device 400A includes 16 laser driving chips and 16 trans-impedance amplifiers.

In some embodiments, the optical module 200 further includes a transmit-receive optical fiber bracket 510A. An end of the transmit-receive optical fiber array 500A is inserted into the transmit-receive optical fiber bracket 510A, and protrudes from the transmit-receive optical fiber bracket 510A. The transmit-receive optical fiber bracket 510A is fixedly connected to the first lens assembly 420A, so that the end of the transmit-receive optical fiber array 500A is inserted into the first lens assembly 420A through the transmit-receive optical fiber bracket 510A. In this way, the optical signals emitted by the first laser array 410A are reflected by the first lens assembly 420A and then incident into the transmit-receive optical fiber array 500A, and the optical signals transmitted by the transmit-receive optical fiber array 500A are reflected by the first lens assembly 420A and then incident into the first detector array 410B.

Figure 11:
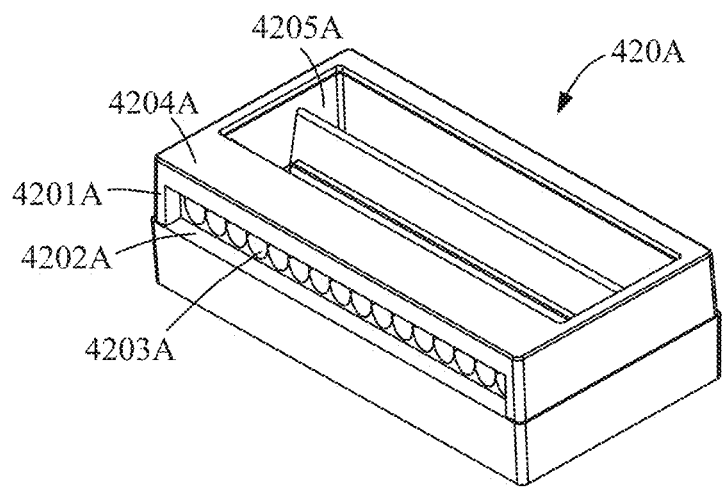
FIG. 11 is a structural diagram of a first lens assembly in an optical module, in accordance with some embodiments.
Figure 12:
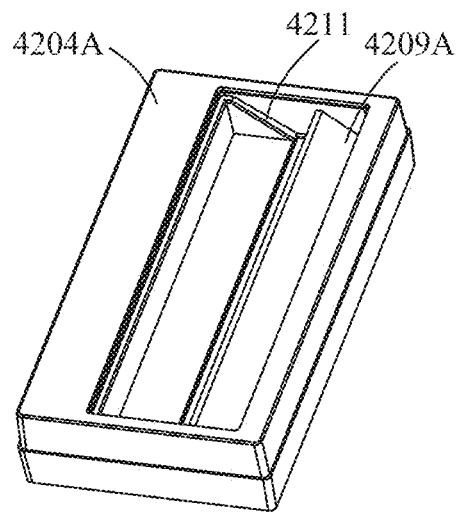
FIG. 12 is a structural diagram of a first lens assembly in an optical module from another perspective, in accordance with some embodiments.
Figure 13:
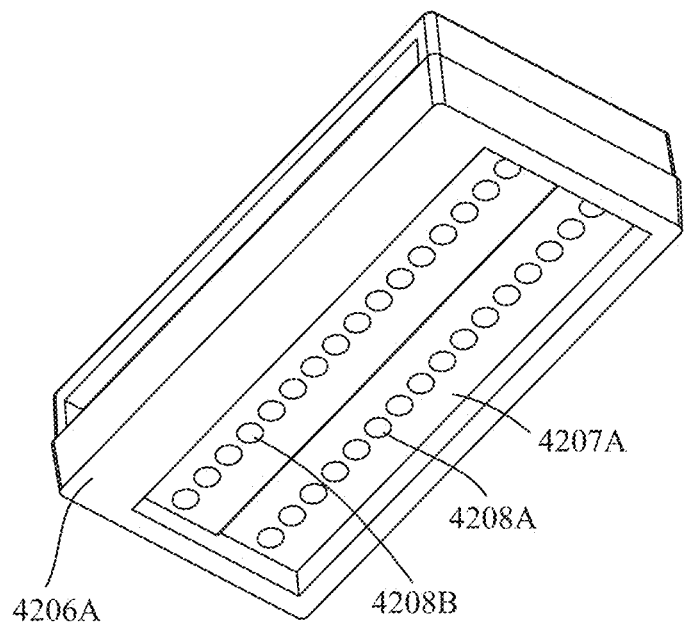
FIG. 13 is a structural diagram of a first lens assembly in an optical module from yet another perspective, in accordance with some embodiments.
Figure 14:
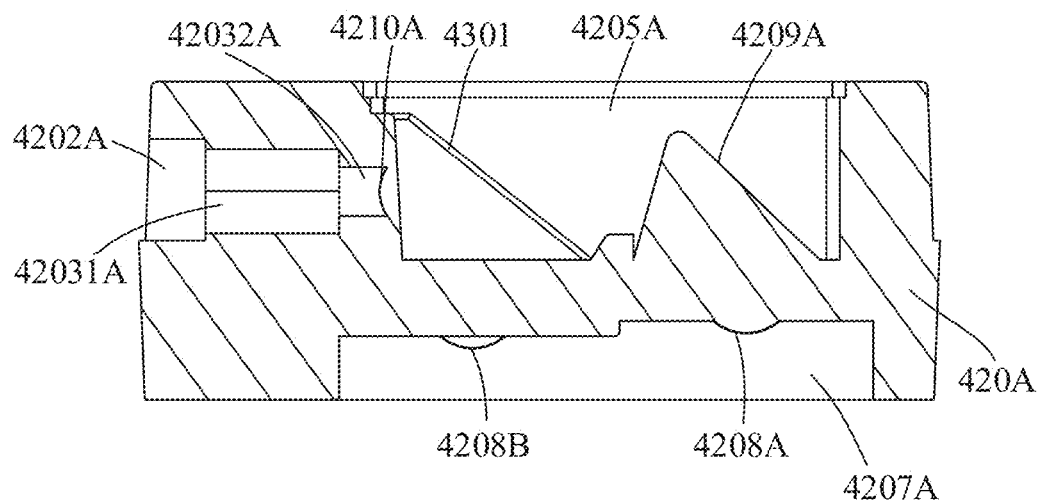
FIG. 14 is a sectional view of a first lens assembly in an optical module, in accordance with some embodiments.

FIG. 11 is a structural diagram of a first lens assembly in an optical module, in accordance with some embodiments. FIG. 12 is a structural diagram of a first lens assembly in an optical module from another perspective, in accordance with some embodiments. FIG. 13 is a structural diagram of a first lens assembly in an optical module from yet another perspective, in accordance with some embodiments. FIG. 14 is a sectional view of a first lens assembly in an optical module, in accordance with some embodiments. As shown in FIGS. 11, 12, 13, and 14, the first lens assembly 420A includes a first top surface 4204A and a first optical port groove 4205A. The first top surface 4204A is a surface of the first lens assembly 420A away from the circuit board 300, and the first optical port groove 4205A is disposed on the first top surface 4204A and is recessed toward an inside of the first lens assembly 420A. The first optical port groove 4205A has a first reflective surface 4209A and a first inclined surface 4211, and the first inclined surface 4211 is closer to the transmit-receive optical fiber array 500A than the first reflective surface 4209A. The first reflective surface 4209A is configured to reflect the optical signals emitted by the first laser array 410A.

In some embodiments, the first lens assembly 420A further includes a first groove and a second groove. Both the first groove and the second groove are disposed on the first top surface 4204A and are recessed into the inside of the first lens assembly 420A, and the first groove communicates with the second groove. The second groove is closer to the transmit-receive optical fiber array 500A than the first groove, an inclined sidewall of the first groove forms a first reflective surface 4209A, and an inclined sidewall of the second groove forms a first inclined surface 4211. The first reflective surface 4209A is configured to reflect the optical signals emitted by the first laser array 410A.

The first lens assembly 420A further includes a wavelength division multiplexer. The optical signals emitted by the first laser array 410A are reflected to the wavelength division multiplexer by the first reflective surface 4209A, and then are transmitted to the transmit-receive optical fiber array 500A through the wavelength division multiplexer, and finally are transmitted to the external optical fiber 101 through the optical fiber adapter 600. As a result, the optical module 200 achieves the emission of optical signals. The optical signals transmitted by the external optical fiber 101 are incident on the wavelength division multiplexer through the optical fiber adapter 600 and the transmit-receive optical fiber array 500A, and then are incident on the first detector array 410B through the wavelength division multiplexer. As a result, the optical module 200 achieves the reception of optical signals.

In this way, a wavelength of the optical signals emitted by the first laser array 410A is different from a wavelength of the optical signals received by the first detector array 410B, and the wavelength division multiplexer realizes the multiplexing of the transmitted optical signals and the received optical signals, so that the transmitted optical signals and the received optical signals share a same optical fiber of the transmit-receive optical fiber array 500A. As a result, the multiplexing of optical fibers is realized, and the number of optical fibers is reduced by half.

In some embodiments, the wavelength division multiplexer is a filter 4301. The first inclined surface 4211 is provided with a hole thereon, and the filter 4301 is disposed in the hole. The filter 4301 has functions of reflection and transmission. Light enters the filter 4301 through the hole, or light emitted from the filter 4301 enters the hole. The filter 4301 is configured to reflect the optical signals transmitted by the transmit-receive optical fiber array 500A to the first detector array 410B, and to transmit the optical signals emitted by the first laser array 410A to the transmit-receive optical fiber array 500A.

In some embodiments, mediums on a front side and a back side of the filter 4301 are air. Light is incident into the filter 4301 through the air, and then is incident into the air again after passing through the filter 4301, this is a best use environment for the filter 4301. A change rule of a refractive index of the medium is single, which helps to realize light splitting properties of the filter 4301.

The optical signals emitted by the first laser array 410A are incident on the first reflective surface 4209A, and are reflected by the first reflective surface 4209A to the filter 4301, then are transmitted through the filter 4301 into the transmit-receive optical fiber array 500A, and finally are transmitted to the external optical fiber 101 through the optical fiber adapter 600. As a result, the optical module 200 may transmit the optical signals to the outside. The optical signals transmitted by the external optical fiber 101 are incident on the filter 4301 through the optical fiber adapter 600 and the transmit-receive optical fiber array 500A, and are reflected by the filter 4301 and then incident on the first detector array 410B. As a result, the optical module 200 may receive the optical signals from the external optical fiber 101.

In some other embodiments, the wavelength division multiplexer is the first inclined surface 4211. The first inclined surface 4211 is coated with an optical film, and is configured to reflect the optical signals transmitted by the transmit-receive optical fiber array 500A to the first detector array 410B, and transmit the optical signals emitted by the first laser array 410A to the transmit-receive optical fiber array 500A.

The optical signals emitted by the first laser array 410A are incident on the first reflective surface 4209A, and are reflected by the first reflective surface 4209A to the first inclined surface 4211, then are transmitted to the transmit-receive optical fiber array 500A through the first inclined surface 4211, and finally are transmitted to the external optical fiber 101 through the optical fiber adapter 600. As a result, the optical module 200 may transmit the optical signals to the outside. The optical signals transmitted by the external optical fiber 101 are incident on the first inclined surface 4211 through the optical fiber adapter 600 and the transmit-receive optical fiber array 500A, and are reflected by the first inclined surface 4211 and then are incident on the first detector array 410B. As a result, the optical module 200 may receive the optical signals from the external optical fiber 101. The following descriptions will be given by considering an example in which the wavelength division multiplexer is the filter 4301.

The first lens assembly 420A further includes a first bottom surface 4206A and a third groove 4207A. The first bottom surface 4206A is a surface of the first lens assembly 420A proximate to the circuit board 300. The third groove 4207A is disposed on the first bottom surface 4206A and is recessed toward the inside of the first lens assembly 420A. The first bottom surface 4206A is fixedly connected to the surface of the circuit board 300, the third groove 4207A forms a sealed cavity with the surface of the circuit board 300, and the first laser array 410A and the first detector array 410B are located in the sealed cavity.

The first lens assembly 420A further includes a first collimating lens array 4208A and a first convergent lens array 4208B. Both the first collimating lens array 4208A and the first convergent lens array 4208B are disposed on a bottom surface of the third groove 4207A, a position of the first collimating lens array 4208A corresponds to a position of the first laser array 410A, and a position of the first convergent lens array 4208B corresponds to a position of the first detector array 410B. That is, a first collimating lens of the first collimating lens array 4208A is arranged corresponding to a laser of the first laser array 410A, so that the optical signals emitted by the first laser array 410A are converted into a plurality of channels of collimated beams through the first collimating lens array 4208A, and the plurality of channels of collimated beams are incident on the first reflective surface 4209A respectively for reflection.

The first convergent lens array 4208B is arranged corresponding to the first detector array 410B. That is, a first convergent lens of the first convergent lens array 4208B is arranged corresponding to a detector of the first detector array 410B, so that the optical signals transmitted by the transmit-receive optical fiber array 500A are reflected by the wavelength division multiplexer (i.e. the filter 4301 or the first inclined surface 4211), and the reflected optical signals are converted into a plurality of channels of convergent beams by the first convergent lens array 4208B, and the plurality of channels of convergent beams are incident into the first detector array 410B.

The first lens assembly 420A includes a first side surface 4201A, a fourth groove 4202A, and a plurality of first optical fiber sockets 4203A. The first side surface 4201A is a surface of the first lens assembly 420A proximate to the transmit-receive optical fiber array 500A. The fourth groove 4202A is disposed on the first side surface 4201A and is recessed into the inside of the first lens assembly 420A. The plurality of first optical fiber sockets 4203A are disposed on a bottom surface of the fourth groove 4202A. The transmit-receive optical fiber bracket 510A is inserted into the fourth groove 4202A, so that the transmit-receive optical fiber array 500A fixed in the transmit-receive optical fiber bracket 510A is inserted into the plurality of first optical fiber sockets 4203A. As a result, the transmit-receive optical fiber array 500A is inserted into the first lens assembly 420A.

Each first optical fiber socket 4203A includes a first connection hole 42031A and a second connection hole 42032A. The first connection hole 42031A and the second connection hole 42032A are arranged in sequence, the first connection hole 42031A is closer to the first side surface 4201A than the second connection hole 42032A, and the first connection hole 42031A communicates with the second connection hole 42032A.

The first connection hole 42031A and the second connection hole 42032A have different inner diameters, and the inner diameter of the first connection hole 42031A is larger than the inner diameter of the second connection hole 42032A. A dimension of the fourth groove 4202A along the direction perpendicular to the circuit board 300 is larger than the inner diameter of the first connection hole 42031A.

Figure 15:
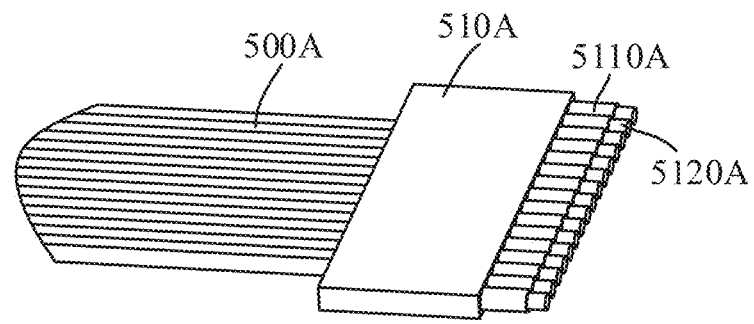
FIG. 15 is a structural diagram showing a portion of a transmit-receive optical fiber array in an optical module, in accordance with some embodiments.

FIG. 15 is a structural diagram showing a portion of a transmit-receive optical fiber array in an optical module, in accordance with some embodiments. As shown in FIG. 15, a shape of each optical fiber in the transmit-receive optical fiber array 500A is consistent with a shape of the third fiber socket 4203A. Each optical fiber in the transmit-receive optical fiber array 500A includes a core layer 5120A, a cladding layer 5110A and a protective layer, and the cladding layer 5110A is disposed between the core layer 5120A and the protective layer. The protective layer is located in an insertion hole of the transmit-receive optical fiber bracket 510A, and the cladding layer 5110A and the core layer 5120A protrude from the transmit-receive optical fiber bracket 510A to be inserted into the first optical fiber socket 4203A.

In a case where the transmit-receive optical fiber array 500A is inserted into the first lens assembly 420A, the core layer 5120A is located in the second connection hole 42032A, the cladding layer 5110A is located in the first connection hole 42031A, and an end of the transmit-receive optical fiber bracket 510A is located in the fourth groove 4202A. The transmit-receive optical fiber bracket 510A is fixed by the fourth groove 4202A, so that the optical fiber protruding from the transmit-receive optical fiber bracket 510A is inserted into the first optical fiber socket 4203A. Thus, the transmit-receive optical fiber array 500A is fixed in the first lens assembly 420A.

The first lens assembly 420A further includes a plurality of first lenses 4210A, and each first lens 4210A is disposed at an end of a corresponding first optical fiber socket 4203A proximate to the first reflective surface 4209A. That is, each first lens 4210A is disposed at an end of the second connection hole 42032A away from the first connection hole 42031A. The first lenses 4210A are used for converging the optical signals emitted by the first laser array 410A, so as to couple the converged optical signals into optical fibers in corresponding first optical fiber sockets 4203A. The first lenses 4210A are also used for collimating the optical signals transmitted by the transmit-receive optical fiber array 500A, and the collimated optical signals are reflected by the wavelength division multiplexer into the first detector array 410B. In this way, coupling accuracy of the transmitted optical signals and the received optical signals to the transmit-receive optical fiber array 500A may be improved.

In some embodiments, the fourth groove 4202A and the plurality of first optical fiber sockets 4203A are integrally formed with the first lens assembly 420A. In this way, it may be ensured that a relative position between the transmit-receive optical fiber array 500A and the first lens assembly 420A is fixed, and there is no positional deviation between the transmit-receive optical fiber array 500A and the first lens assembly 420A, which helps to improve coupling accuracy of the reflected optical signals to the optical fiber. As a result, optical coupling efficiency is increased in a case where the optical signals are coupled from the first lens assembly 420A to the transmit-receive optical fiber array 500A.

Figure 16:
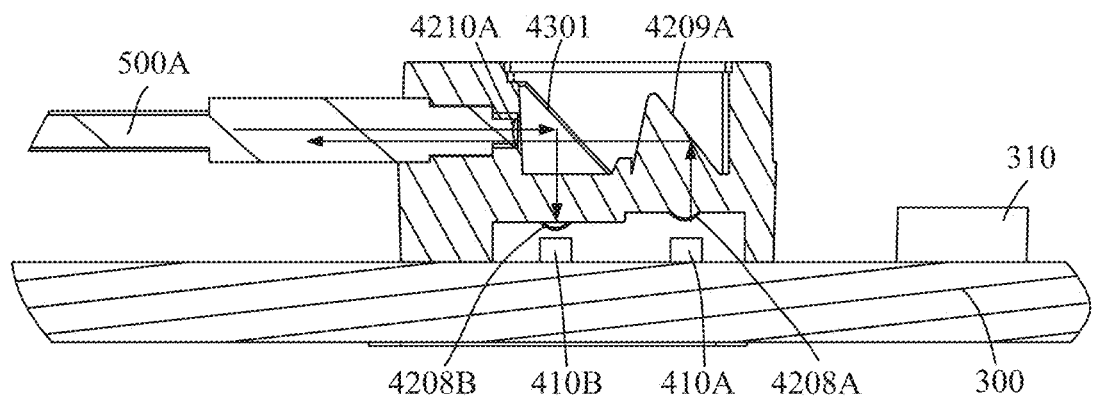
FIG. 16 is a sectional view showing a portion of an assembly of a circuit board, a light transmit-receive device, and a transmit-receive optical fiber array in an optical module, in accordance with some embodiments.

FIG. 16 is a sectional view showing a portion of an assembly of a circuit board, a light transmit-receive device, and a transmit-receive optical fiber array in an optical module, in accordance with some embodiments. As shown in FIG. 16, the first laser array 410A and the first detector array 4106 are fixed on the circuit board 300, the first lens assembly 420A covers the first laser array 410A and the first detector array 410B, and the transmit-receive optical fiber array 500A is inserted into the first lens assembly 420A through the transmit-receive optical fiber bracket 510A. The master monitor inputs 8 channels of PAM4 electrical signals each with a transmission rate of 200 Gb/s to the circuit board 300 through the connecting finger 301, and the 8 channels of PAM4 electrical signals each with a transmission rate of 200 Gb/s are decoded into 16 channels of PAM4 electrical signals each with a transmission rate of 100 Gb/s through the reverse gearbox of the data processor 310.

After processed by 16 laser driver chips, the 16 channels of PAM4 electrical signals each with a transmission rate of 100 Gb/s drive the 16 lasers to emit 16 channels of optical signals. The 16 channels of optical signals are converted into 16 channels of collimated beams through 16 first collimating lenses of the first collimating lens array 4208A respectively, and the 16 channels of collimated beams are reflected by the first reflective surface 4209A. The reflected 16 channels of collimated beams are transmitted by the filter 4301 into the 16 first lenses 4210A respectively, and then are converted into convergent beams through the corresponding first lenses 4210A. Each channel of convergent beam is coupled to the optical fiber in the first optical fiber socket 4203A, so as to realize transmission of the 16 channels of optical signals.

16 optical fibers in the transmit-receive optical fiber array 500 transmit 16 channels of optical signals respectively, and the 16 channels of optical signals are incident into the 16 first lenses 4210A respectively. Each channel of optical signal is converted into a collimated beam by a corresponding first lens 4210A, and each channel of collimated beam is reflected by the filter 4301. The reflected 16 channels of collimated beams are converged into the first detector array 410B through the first convergent lens array 4208B, and are converted into 16 channels of PAM4 electrical signals each with a transmission rate of 100 Gb/s by the first detector array 410B.

The 16 channels of PAM4 electrical signals each with a transmission rate of 100 Gb/s are amplified by 16 trans-impedance amplifiers, and the amplified 16 channels of PAM4 electrical signals each with a transmission rate of 100 Gb/s are transmitted to the gearbox of the data processor 310, and are encoded into 8 channels of PAM4 electrical signals each with a transmission rate of 200 Gb/s through the gearbox. The 8 channels of PAM4 electrical signals each with a transmission rate of 200 Gb/s are transmitted to the master monitor through the connecting finger 301, so as to realize reception of the 16 channels of optical signals.

In some embodiments, the light emitted by the first laser array 410A and the light received by the first detector array 410B have different wavelengths, and a laser in the first laser array 410A is arranged corresponding to a detector in the first detector array 410B. In this way, an optical signal emitted by the laser and an optical signal received by the corresponding detector are split through the filter 4301. That is, an optical signal emitted by the laser is transmitted into an optical fiber through the filter 4301, and an optical signal transmitted by the same optical fiber is incident into the detector after being reflected by the filter 4301. In this way, the optical signal emitted by the laser and the optical signal received by the corresponding detector enter the same optical fiber, so that the transmitted optical signal and the received optical signal share the same optical fiber.

In some embodiments, an optical module at one end of the transmission system may be set as follows: a wavelength of light emitted by the first laser array 410A may be 870 nm, and a wavelength of light received by the first detector array 410B may be 910 nm. In this way, the filter 4301 may transmit light with a wavelength of 870 nm and reflect light with a wavelength of 910 nm, so that the emitted light with the wavelength of 870 nm and the received light with the wavelength of 910 nm share the same optical fiber. An optical module at another end of the transmission system may be set as follows: a wavelength of light emitted by the first laser array 410A is 910 nm, and a wavelength of light received by the first detector array 410B may be 870 nm. In this way, the filter 4301 may transmit light with a wavelength of 910 nm and reflect light with a wavelength of 870 nm, so that the emitted light with the wavelength of 910 nm and the received light with the wavelength of 870 nm share the same optical fiber. Thus, a pair of end-to-end transmission systems is formed.

In some embodiments, the structure of the light transmit-receive device 400A is not limited to the structure described in the above embodiments, as long as a single-fiber bidirectional transmission of the optical module may be realized, which are all included in the scope of protection of the embodiments of the present disclosure.

In the optical module provided by some embodiments of the present disclosure, optical wave combining technology and optical wave division technology may be applied simultaneously, so that a transmitted optical signal and a received optical signal share a same optical fiber. Therefore, a multiplexing of optical fibers is realized, and the cost of optical fibers is saved.

In some embodiments, as shown in FIG. 5, the light transmit-receive assembly 400 includes a light emitting device 400B and a light receiving device 400C. The optical fiber array 500 includes a transmitting optical fiber array 500B and a receiving optical fiber array 500C. One end of the transmitting optical fiber array 500B is connected to the light emitting device 400B, and another end of the transmitting optical fiber array 500B is connected to the optical fiber adapter 600. One end of the receiving optical fiber array 500C is connected to the light receiving device 400C, and another end of the receiving optical fiber array 500C is connected to the optical fiber adapter 600. The light emitting device 400B is connected to the external optical fiber 101 through the transmitting optical fiber array 500B and the optical fiber adapter 600, and the light receiving device 400C is connected to the external optical fiber 101 through the receiving optical fiber array 500C and the optical fiber adapter 600.

An optical signal emitted by the light emitting device 400B is transmitted to the external optical fiber 101 through the transmitting optical fiber array 500B and the optical fiber adapter 600, and the optical signal transmitted by the external optical fiber 101 is transmitted to the light receiving device 400C through the optical fiber adapter 600 and the receiving optical fiber array 500C. Therefore, it is realized that the light emitting device 400B outputs the optical signal to the external optical fiber 101, or the light receiving device 400C receives the optical signal from the external optical fiber 101.

In some embodiments, the light emitting device 400B and the light receiving device 400C may be arranged along a length direction of the circuit board 300. For example, the light emitting device 400B is farther from the optical fiber adapter 600 than the light receiving device 400C, and the transmitting optical fiber array 500B is connected to the optical fiber adapter 600 across the light receiving device 400C. In some embodiments, the light emitting device 400B and the light receiving device 400C may also be arranged along a width direction of the circuit board 300, and the transmitting optical fiber array 500B and the receiving optical fiber array 500C are connected to the optical fiber adapter 600 side by side.

Figure 17:
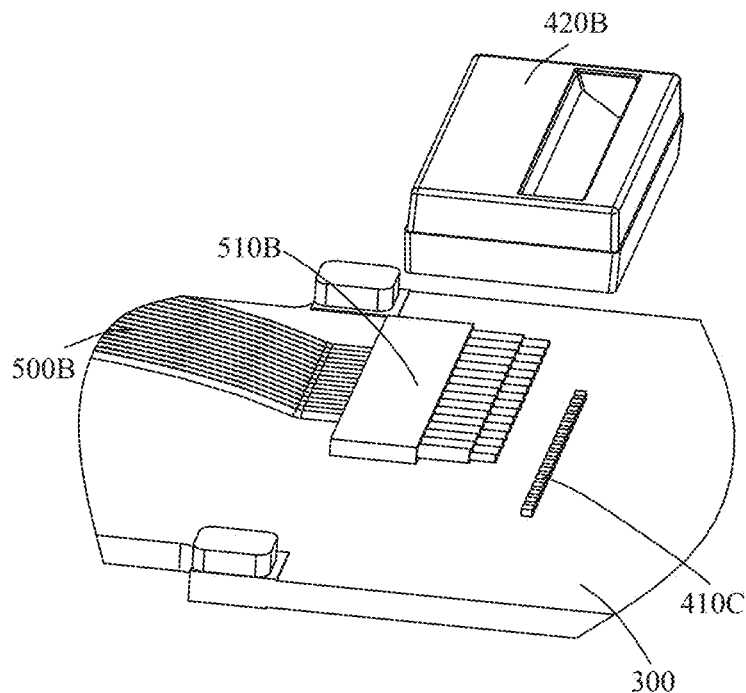
FIG. 17 is an exploded view showing a portion of a circuit board and a light emitting device in an optical module, in accordance with some embodiments.

FIG. 17 is an exploded view showing a portion of a circuit board and a light emitting device in an optical module, in accordance with some embodiments. As shown in FIG. 17, the light emitting device 400B includes a second laser array 410C and a second lens assembly 420B. The second laser array 410C is disposed on the circuit board 300 and includes a plurality of lasers. The structure of the second laser array 410C is the same as that of the first laser array 410A, and details will not be repeated here.

The second lens assembly 420B is disposed on the circuit board 300, and forms a sealed cavity with the circuit board 300, and the second laser array 410C is located in the sealed cavity. The second lens assembly 420B is connected to an end of the transmitting optical fiber array 500B, and is configured to change a propagation direction of optical signals emitted by the second laser array 410C, thereby enabling the optical signals to be coupled into the transmitting optical fiber array 500B.

The optical signals emitted by the second laser array 410C enter the second lens assembly 420B, then are reflected to the transmitting optical fiber array 500B by the second lens assembly 420B, and finally are transmitted to the external optical fiber 101 through the optical fiber adapter 600, thereby achieving the output of the optical signals to the outside of the optical module 200. It will be seen that, the second lens assembly 420B not only plays a role of sealing the second laser array 410C, but also establishes optical connection between the second laser array 410C and the transmitting optical fiber array 500B.

In some embodiments, the light emitting device 400B further includes a plurality of laser driving chips corresponding to the plurality of lasers. The plurality of laser driving chips are disposed on the circuit board 300, and are located in the sealed cavity formed by the second lens assembly 420B and the circuit board 300, and are configured to drive the corresponding lasers to emit optical signals. For example, the light emitting device 400B includes 16 laser driving chips. It will be understood that the plurality of laser driving chips may also be referred to as a laser driving chip array.

In some embodiments, the optical module 200 further includes a transmitting optical fiber bracket 510B. An end of the transmitting optical fiber array 500B is inserted into the transmitting optical fiber bracket 510B, and protrudes from the transmitting optical fiber bracket 510B. The transmitting optical fiber bracket 510B is fixedly connected to the second lens assembly 420B, so that the end of the transmitting optical fiber array 500B is inserted into the second lens assembly 420B through the transmitting optical fiber bracket 510B. As a result, the optical signals reflected by the second lens assembly 420B can be coupled into the transmitting optical fiber array 500B.

Figure 18:
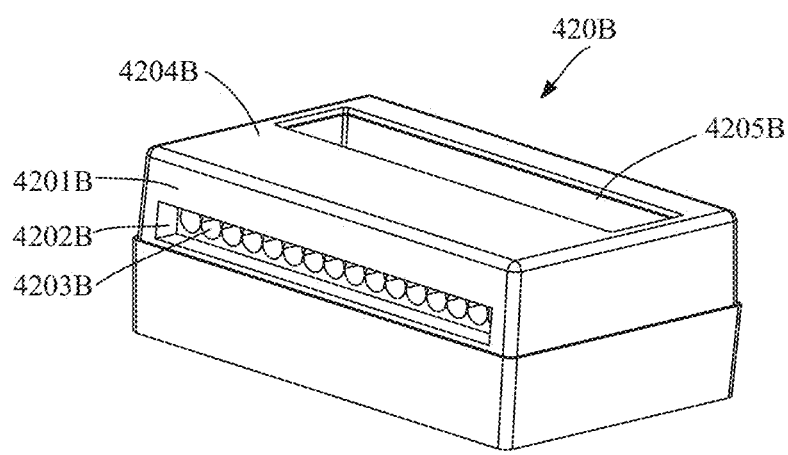
FIG. 18 is a structural diagram of a second lens assembly in an optical module, in accordance with some embodiments.
Figure 19:
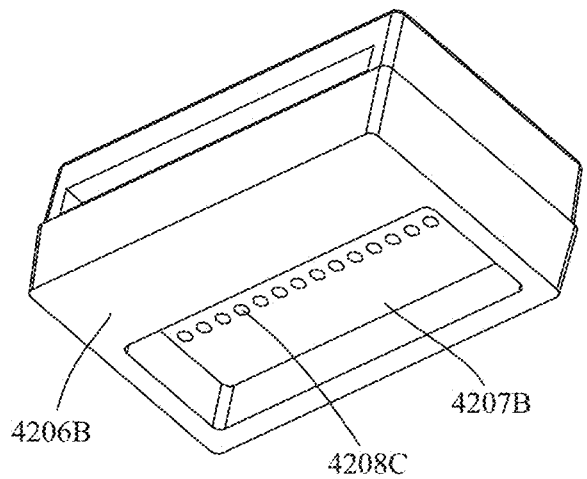
FIG. 19 is a structural diagram of a second lens assembly in an optical module from another perspective, in accordance with some embodiments.
Figure 20:
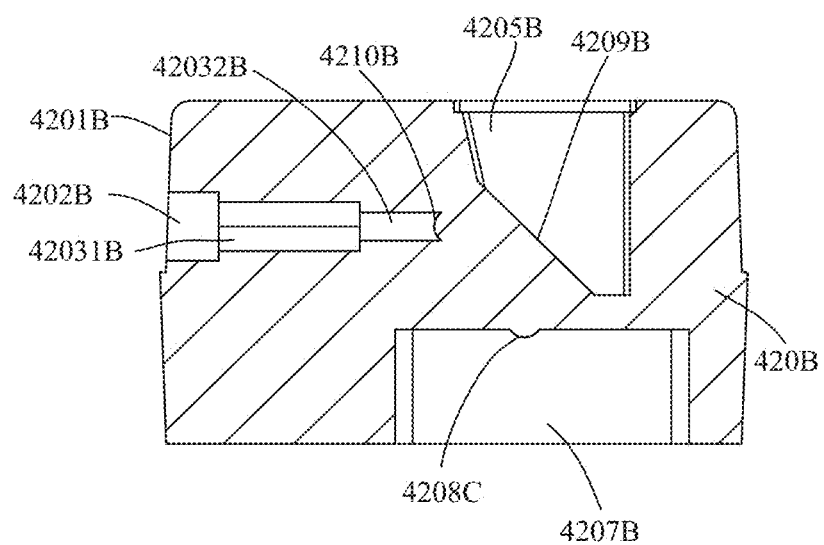
FIG. 20 is a sectional view of a second lens assembly in an optical module, in accordance with some embodiments.

FIG. 18 is a structural diagram of a second lens assembly in an optical module, in accordance with some embodiments. FIG. 19 is a structural diagram of a second lens assembly in an optical module from another perspective, in accordance with some embodiments. FIG. 20 is a sectional view of a second lens assembly in an optical module, in accordance with some embodiments. As shown in FIGS. 18, 19 and 20, the second lens assembly 420B includes a second top surface 4204B and a second optical port groove 4205B. The second top surface 4204B is a surface of the second lens assembly 420B away from the circuit board 300, and the second optical port groove 4205B is disposed on the second top surface 4204B and is recessed toward an inside of the second lens assembly 420B. An inclined sidewall of the second optical port groove 4205B forms a second reflective surface 4209B, and the second reflective surface 4209B is used for reflecting the optical signals emitted by the second laser array 410C into the transmitting optical fiber array 500B, so as to achieve light emission.

The second lens assembly 420B further includes a second bottom surface 4206B and a fifth groove 4207B. The second bottom surface 4206B is a surface of the second lens assembly 420B proximate to the circuit board 300, and the fifth groove 4207B is disposed on the second bottom surface 4206B and is recessed toward the inside of the second lens assembly 420B. The second bottom surface 4206B is fixedly connected to the surface of the circuit board 300, the fifth groove 4207B and the surface of the circuit board 300 form a sealed cavity, and the second laser array 410C is located in the sealed cavity.

The second lens assembly 420B further includes a second collimating lens array 4208C. The second collimating lens array 4208C is disposed on a bottom surface of the fifth groove 4207B, and corresponds to a position of the second laser array 410C. That is, a second collimating lens of the second collimating lens array 4208C is arranged corresponding to a laser of the second laser array 410C. In this way, the optical signals emitted by the second laser array 410C are collimated by the second collimating lens array 4208C and then incident on the second reflective surface 4209B.

The second lens assembly 420B further includes a second side surface 4201B, a sixth groove 4202B, and a plurality of second optical fiber sockets 4203B. The second side surface 4201B is a surface of the second lens assembly 420B proximate to the transmitting optical fiber array 500B. The sixth groove 4202B is disposed on the second side surface 4201B, and is recessed toward the inside of the second lens assembly 420B. The plurality of second optical fiber sockets 4203B are disposed on a bottom surface of the sixth groove 4202B. The transmitting optical fiber bracket 510B is inserted into the sixth groove 4202B, so that the transmitting optical fiber array 500B fixed in the transmitting optical fiber bracket 510B is inserted into the plurality of second optical fiber sockets 4203B. As a result, the transmitting optical fiber array 500B is inserted into the second lens assembly 420B.

Each second optical fiber socket 4203B includes a first connection portion 42031B and a second connection portion 42032B. The first connection portion 42031B and the second connection portion 42032B are arranged in sequence, the first connection portion 42031B is closer to the second side surface 4201B than the second connection portion 42032B, and the first connection portion 42031B communicates with the second connection portion 42032B.

The first connection portion 42031B and the second connection portion 42032B have different inner diameters, and the inner diameter of the first connection portion 42031B is greater than the inner diameter of the second connection portion 42032B. A dimension of the sixth groove 4202B along a direction perpendicular to the circuit board 300 is greater than the inner diameter of the first connection portion 42031B.

Figure 21:
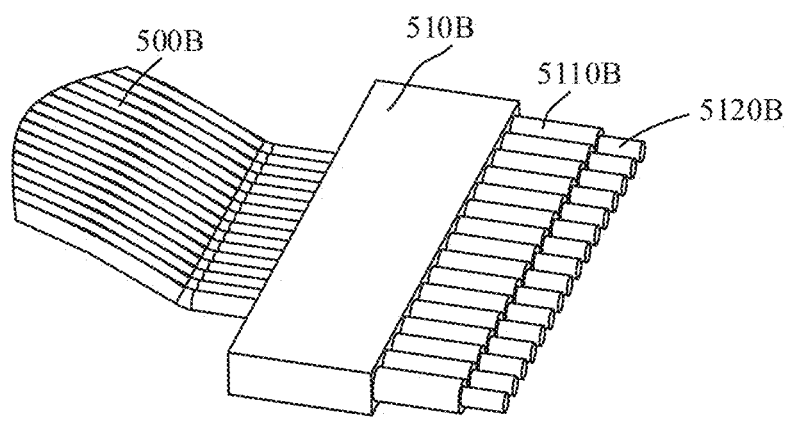
FIG. 21 is a structural diagram showing a portion of a transmitting optical fiber array in an optical module, in accordance with some embodiments.

FIG. 21 is a structural diagram showing a portion of a transmitting optical fiber array in an optical module, in accordance with some embodiments. As shown in FIG. 21, a shape of each optical fiber in the transmitting optical fiber array 500B is consistent with a shape of the second optical fiber socket 4203B. Each optical fiber in the transmitting optical fiber array 500B includes a core layer 5120B, a cladding layer 5110B and a protective layer, and the cladding layer 5110B is disposed between the core layer 5120B and the protective layer. The protective layer is located in an insertion hole of the transmitting optical fiber bracket 510B, and the cladding layer 5110B and the core layer 5120B protrude from the transmitting optical fiber bracket 510B to be inserted into the second optical fiber socket 4203B.

In the case where the transmitting optical fiber array 500B is inserted into the second lens assembly 420B, the core layer 5120B is located in the second connection portion 42032B, the cladding layer 5110B is located in the first connection portion 42031B, and an end of the transmitting optical fiber bracket 510B is located in the sixth groove 4202B. The transmitting optical fiber bracket 510B is fixed by the sixth groove 4202B, so that the optical fiber protruding from the transmitting optical fiber bracket 510B is inserted into the second optical fiber socket 4203B. Thus, the transmitting optical fiber array 500B is fixed in the second lens assembly 420B.

In some embodiments, the sixth groove 4202B and the plurality of second optical fiber sockets 4203B are integrally formed with the second lens assembly 420B. In this way, it may be ensured that a relative position between the transmitting optical fiber array 500B and the second lens assembly 420B is fixed, and there is no positional deviation between the transmitting optical fiber array 500B and the second lens assembly 420B, which helps to improve coupling accuracy of the reflected optical signals to the optical fiber, and further increases optical coupling efficiency of the optical signals from the second lens assembly 420B to the transmitting optical fiber array 500B.

The second lens assembly 420B further includes a plurality of second convergent lenses 4210B, and each second convergent lens 4210B is disposed at an end of a corresponding second optical fiber socket 4203B proximate to the second reflective surface 4209B. That is, each second convergent lens 4210B is disposed at an end of the second connection portion 42032B away from the first connection portion 42031B. The second convergent lens 4210B is used for converging the optical signals reflected by the second reflective surface 4209B, so as to couple the converged optical signals into an optical fiber in the corresponding second optical fiber socket 4203B, and improve coupling accuracy between the reflected optical signals and the optical fiber. It will be understood that the plurality of second convergent lenses 4210B may also be referred to as a second convergent lens array.

Figure 22:
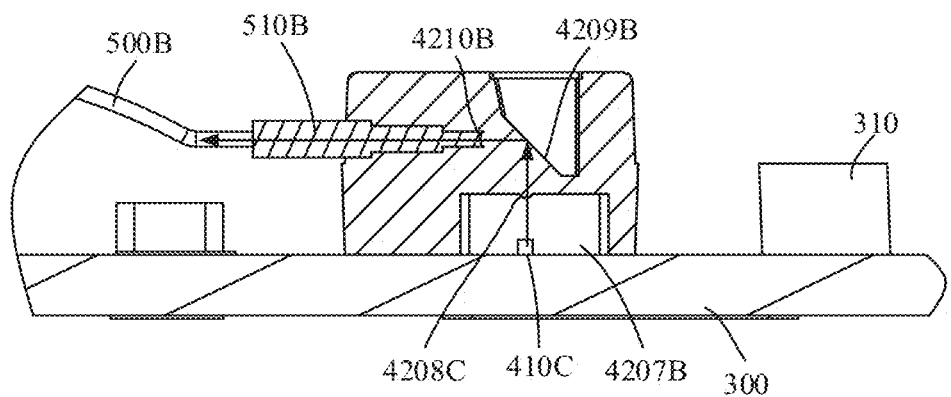
FIG. 22 is a sectional view showing a portion of an assembly of a circuit board, a light emitting device and a transmitting optical fiber array in an optical module, in accordance with some embodiments.

FIG. 22 is a sectional view showing a portion of an assembly of a circuit board, a light emitting device and a transmitting optical fiber array in an optical module, in accordance with some embodiments. As shown in FIG. 22, the second laser array 410C is fixed on the circuit board 300, the second lens assembly 420B covers the second laser array 410C, and the transmitting optical fiber array 500B is inserted into the second lens assembly 420B through the transmitting optical fiber bracket 5106. The master monitor inputs 8 channels of PAM4 electrical signals each with a transmission rate of 200 Gb/s to the circuit board 300 through the connecting finger 301, and the 8 channels of PAM4 electrical signals each with a transmission rate of 200 Gb/s are decoded into 16 channels of PAM4 electrical signals each with a transmission rate of 100 Gb/s through the reverse gearbox of the data processor 310.

After processed by 16 laser driving chips, the 16 channels of PAM4 electrical signals each with a transmission rate of 100 Gb/s drive the 16 lasers to generate 16 channels of transmitted optical signals. The 16 channels of transmitted optical signals are converted into 16 channels of collimated beams by 16 second collimating lenses of the second collimating lens array 4208C respectively, and the 16 channels of collimated beams are reflected by the second reflective surface 4209B. The reflected 16 channels of collimated beams are incident into 16 second convergent lenses 4210B respectively, and each channel of reflected collimated beam is converted into a convergent beam by a second convergent lens 4210B. The convergent beam is coupled into an optical fiber inserted into the second optical fiber socket 4203B, so that transmission of the 16 channels of transmitted optical signals is achieved.

In some embodiments, the structure of the light emitting device 400B is not limited to the structure described in the above embodiments, as long as a coupling target of the emitted optical signals may be achieved. For example, the light emitting device 400B adopts a single lens or a simple double lens, which are both included in the scope of protection of the embodiments of the present disclosure.

Figure 23:
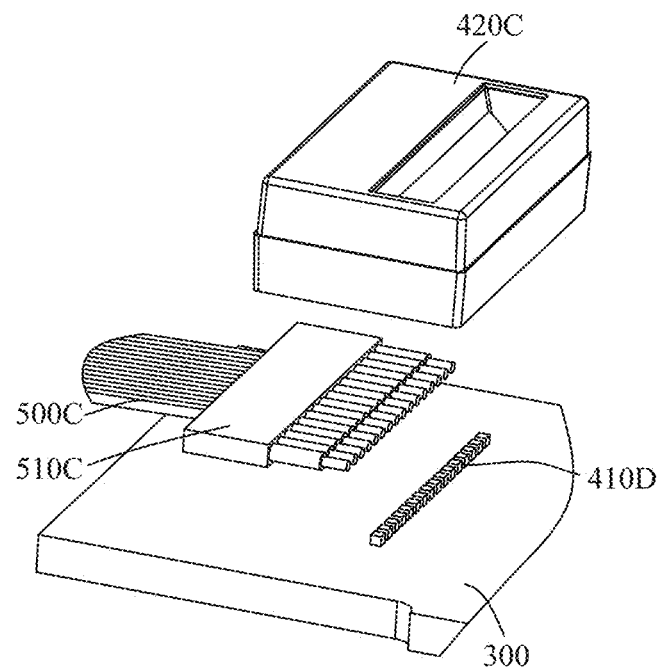
FIG. 23 is an exploded view showing a portion of a circuit board and a light receiving device in an optical module, in accordance with some embodiments.

FIG. 23 is an exploded view showing a portion of a circuit board and a light receiving device in an optical module, in accordance with some embodiments. As shown in FIG. 23, the light receiving device 400C includes a second detector array 410D and a third lens assembly 420C. The second detector array 410D is disposed on the circuit board 300 and includes a plurality of detectors. The structure of the second detector array 410D is the same as that of the first detector array 410B, and details will not be repeated here.

The third lens assembly 420C is disposed on the circuit board 300 and forms a sealed cavity with the circuit board 300, and the second detector array 410D is located in the sealed cavity. The third lens assembly 420C is connected to an end of the receiving optical fiber array 500C, and is configured to change a propagation direction of the optical signals transmitted by the receiving optical fiber array 500C, so that the optical signals may be incident on the second detector array 410D.

The optical signals transmitted by the external optical fiber 101 enter an inside of the third lens assembly 420C through the optical fiber adapter 600 and the receiving optical fiber array 500C, and enter the second detector array 410D after being reflected by the third lens assembly 420C. Thus, reception of the optical signals from the outside of the optical module 200 is achieved. It will be seen that, the third lens assembly 420C not only plays a role of sealing the second detector array 410D, but also establishes optical connection between the second detector array 410D and the receiving optical fiber array 500C.

In some embodiments, the light receiving device 400C further includes a plurality of trans-impedance amplifiers corresponding to the plurality of detectors. The plurality of trans-impedance amplifiers are disposed on the circuit board 300 and located in the sealed cavity formed by the third lens assembly 420C and the circuit board 300, and are configured to amplify electrical signals converted by corresponding detectors. For example, the light receiving device 400C includes 16 trans-impedance amplifiers. It will be understood that the plurality of trans-impedance amplifiers may also be referred to as a trans-impedance amplifier array.

In some embodiments, the optical module 200 further includes a receiving optical fiber bracket 510C. An end of the receiving optical fiber array 500C is inserted into the receiving optical fiber bracket 510C and protrudes from the receiving optical fiber bracket 510C. The receiving optical fiber bracket 510C is fixedly connected to the third lens assembly 420C, so that the end of the receiving optical fiber array 500C is inserted into the third lens assembly 420C through the receiving optical fiber bracket 510C. As a result, the optical signals transmitted by the receiving optical fiber array 500C can be incident on the third lens assembly 420C.

Figure 24:
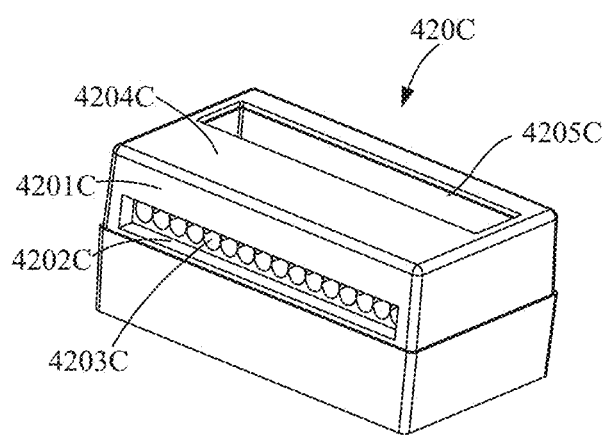
FIG. 24 is a structural diagram of a third lens assembly in an optical module, in accordance with some embodiments.
Figure 25:
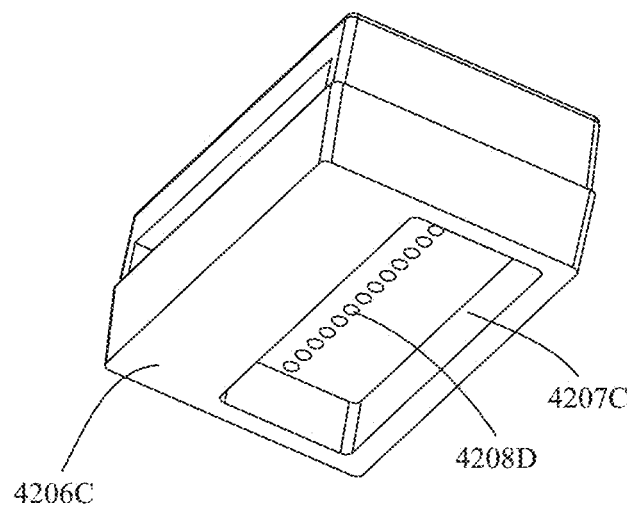
FIG. 25 is a structural diagram of a third lens assembly in an optical module from another perspective, in accordance with some embodiments.
Figure 26:
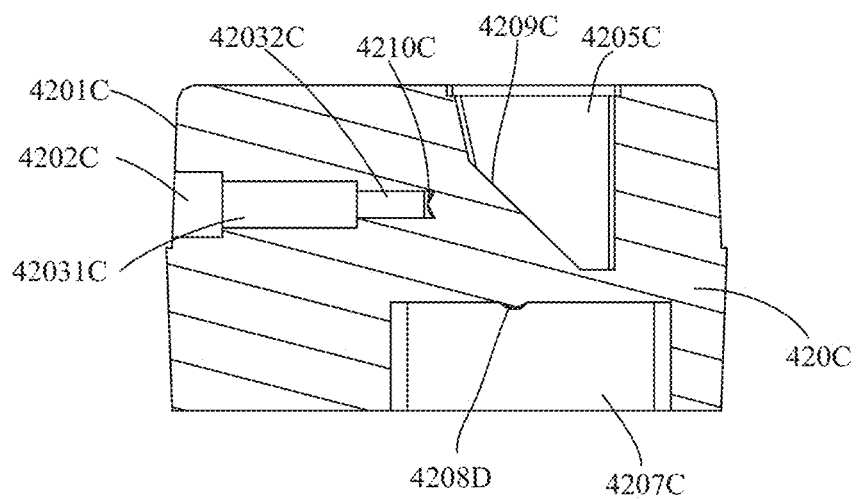
FIG. 26 is a sectional view of a third lens assembly in an optical module, in accordance with some embodiments.

FIG. 24 is a structural diagram of a third lens assembly in an optical module, in accordance with some embodiments. FIG. 25 is a structural diagram of a third lens assembly in an optical module from another perspective, in accordance with some embodiments. FIG. 26 is a sectional view of a third lens assembly in an optical module, in accordance with some embodiments. As shown in FIGS. 24, 25, and 26, the third lens assembly 420C includes a third top surface 4204C and a third optical port groove 4205C. The third top surface 4204C is a surface of the third lens assembly 420C away from the circuit board 300, and the third optical port groove 4205C is disposed on the third top surface 4204C and is recessed toward an inside of the third lens assembly 420C. An inclined sidewall of the third optical port groove 4205C forms a third reflective surface 4209C, and the third reflective surface 4209C is used for reflecting the optical signals transmitted by the receiving optical fiber array 500C to the second detector array 410D, so as to achieve light reception.

The third lens assembly 420C further includes a third bottom surface 4206C and a seventh groove 4207C. The third bottom surface 4206C is a surface of the third lens assembly 420C proximate to the circuit board 300, and the seventh groove 4207C is disposed on the third bottom surface 4206C and is recessed toward the inside of the third lens assembly 420C. The third bottom surface 4206C is fixedly connected to the surface of the circuit board 300, the seventh groove 4207C and the surface of the circuit board 300 form a sealed cavity, and the second detector array 410D is located in the sealed cavity.

The third lens assembly 420C further includes a third convergent lens array 4208D, and the third convergent lens array 4208D is disposed on a bottom surface of the seventh groove 4207C and corresponds to a position of the second detector array 410D. That is, a third convergent lens of the third convergent lens array 4208D is arranged corresponding to a detector of the second detector array 410D. In this way, the optical signals reflected by the third reflective surface 4209C are converged by the third convergent lens array 4208D and then incident on the second detector array 410D.

The third lens assembly 420C further includes a third side surface 4201C, an eighth groove 4202C, and a plurality of third optical fiber sockets 4203C. The third side surface 4201C is a surface of the third lens assembly 420C proximate to the receiving optical fiber array 500C, the eighth groove 4202C is disposed on the third side surface 4201C, and is recessed toward the inside of the third lens assembly 420C. The plurality of third optical fiber sockets 4203C are disposed on a bottom surface of the eighth groove 4202C. The receiving optical fiber bracket 510C is inserted into the eighth groove 4202C, so that the receiving optical fiber array 500C fixed in the receiving optical fiber bracket 510C is inserted into the plurality of third optical fiber sockets 4203C. Thus, the receiving optical fiber array 500C is inserted into the third lens assembly 420C.

Each third optical fiber socket 4203C includes a first insertion portion 42031C and a second insertion portion 42032C. The first insertion portion 42031C and the second insertion portion 42032C are arranged in sequence, the first insertion portion 42031C is closer to the third side surface 4201C than the second insertion portion 42032C, and the first insertion portion 42031C communicates with the second insertion portion 42032C.

The first insertion portion 42031C and the second insertion portion 42032C have different inner diameters, and the inner diameter of the first insertion portion 42031C is larger than the inner diameter of the second insertion portion 42032C. A dimension of the eighth groove 4202C along the direction perpendicular to the circuit board 300 is larger than the inner diameter of the first insertion portion 42031C.

Figure 27:
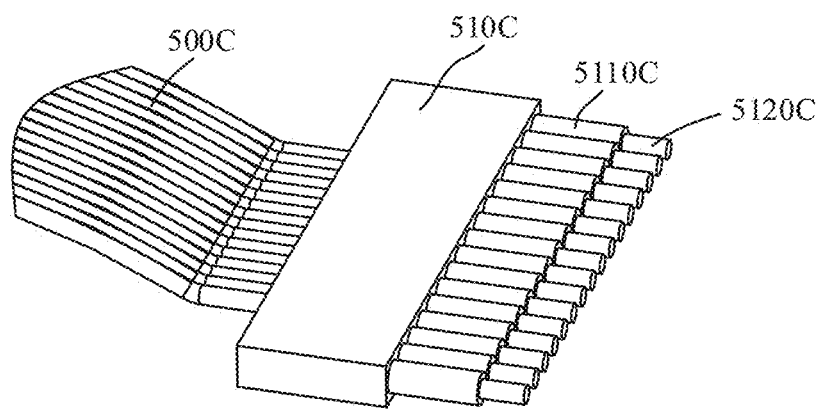
FIG. 27 is a structural diagram showing a portion of a receiving optical fiber array in an optical module, in accordance with some embodiments.

FIG. 27 is a structural diagram showing a portion of a receiving optical fiber array in an optical module, in accordance with some embodiments. As shown in FIG. 27, a shape of each optical fiber in the receiving optical fiber array 500C is consistent with a shape of the third optical fiber socket 4203C. Each optical fiber in the receiving optical fiber array 500C includes a core layer 5120C, a cladding layer 5110C and a protective layer, and the cladding layer 5110C is disposed between the core layer 5120C and the protective layer. The protective layer is located in an insertion hole of the receiving optical fiber bracket 510C, and the cladding layer 5110C and the core layer 5120C protrude from the receiving optical fiber bracket 510C to be inserted into the third optical fiber socket 4203C.

In the case where the receiving optical fiber array 500C is inserted into the third lens assembly 420C, the core layer 5120C is located in the second insertion portion 42032C, the cladding layer 5110C is located in the first insertion portion 42031C, and an end of the receiving optical fiber bracket 510C is located in the eighth groove 4202C. The receiving optical fiber bracket 510C is fixed by the eighth groove 4202C, so that the optical fiber protruding from the receiving optical fiber bracket 510C is inserted into the third optical fiber socket 4203C. As a result, the receiving optical fiber array 500C is fixed in the third lens assembly 420C.

In some embodiments, the eighth groove 4202C and the plurality of third optical fiber sockets 4203C are integrally formed with the third lens assembly 420C. In this case, it may be ensured that a relative position between the receiving optical fiber array 500C and the third lens assembly 420C is fixed, and there is no positional deviation between the receiving optical fiber array 500C and the third lens assembly 420C, which helps to improve coupling accuracy between the optical signals transmitted by the receiving optical fiber array 500C and the third lens assembly 420C.

The third lens assembly 420C further includes a plurality of third collimating lenses 4210C, and each third collimating lens 4210C is disposed at an end of a corresponding third optical fiber socket 4203C proximate to the third reflective surface 4209C. That is, each third collimating lens 4210C is disposed at an end of the second insertion portion 42032C away from the first insertion portion 42031C. The third collimating lens 4210C is used for collimating the optical signals transmitted by the receiving optical fiber array 500C, the collimated optical signals are incident on the third reflective surface 4209C, and are reflected to the second detector array 410D by the third reflective surface 4209C. It will be understood that the plurality of third collimating lenses 4210C may also be referred to as a third collimating lens array.

Figure 28:
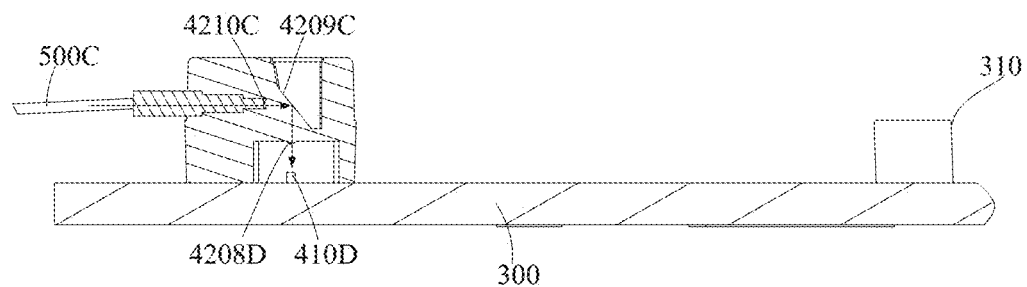
FIG. 28 is a sectional view showing a portion of an assembly of a circuit board, a light receiving device and a receiving optical fiber array in an optical module, in accordance with some embodiments.

FIG. 28 is a sectional view showing a portion of an assembly of a circuit board, a light receiving device and a receiving optical fiber array in an optical module, in accordance with some embodiments. As shown in FIG. 28, the second detector array 410D is fixed on the circuit board 300, the third lens assembly 420C covers the second detector array 410D, and the receiving optical fiber array 500C is inserted into the third lens assembly 420C through the receiving optical fiber bracket 510C. 16 channels of optical signals transmitted by the receiving optical fiber array 500C are incident into 16 third collimating lenses 4210C respectively, and are converted into 16 channels of collimated beams by the third collimating lenses 4210C. The 16 channels of collimated beams are reflected by the third reflective surface 4209C and then incident on the third convergent lens array 4208D, and are converted into 16 channels of convergent beams through the third convergent lens array 4208D. The 16 channels of convergent beams are respectively incident into the second detector array 410D, and the second detector array 410D converts the 16 channels of optical signals into 16 channels of PAM4 electrical signals each with a transmission rate of 100 Gb/s.

The 16 channels of PAM4 electrical signals each with a transmission rate of 100 Gb/s are amplified by 16 trans-impedance amplifiers. The amplified 16 channels of PAM4 electrical signals each with a transmission rate of 100 Gb/s are transmitted to the gearbox, and are encoded into 8 channels of PAM4 electrical signals each with a transmission rate of 200 Gb/s through the gearbox. The 8 channels of PAM4 electrical signals each with a transmission rate of 200 Gb/s are transmitted to the master monitor through the connecting finger 301, so as to achieve reception of the 16 channels of optical signals.

In some embodiments, the structure of the light receiving device 400C is not limited to the structure described in the above embodiments, as long as a coupling target of the received optical signals may be achieved. For example, the light receiving device 400C adopts a single lens or a simple double lens, which are both included in the scope of protection of the embodiments of the present disclosure.

In some embodiments of the present disclosure, in a case where a high electrical port rate (200 Gb/s) is greater than a low optical port rate (100 Gb/s), the data processor 310 is used to change an input electrical port rate and an output electrical port rate, which solves the problem that the limit transmission bandwidth of the VCSEL with the optical port rate of 100 Gb/s cannot match the high electrical port rate. As a result, it is possible to meet the low-cost requirement for short-distance transmission of an optical module with a transmission rate of 1.6 Tb/s, and to construct an optical module with low power consumption, high integration, simple structure and high reliability.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. An optical module, comprising:
 a circuit board;
 a light transmit-receive device disposed on the circuit board, and the light transmit-receive device being configured to emit a plurality of channels of first optical signals, receive a plurality of channels of second optical signals from outside of the optical module, and convert the plurality of channels of second optical signals into a plurality of channels of electrical signals;
 a data processor disposed on the circuit board, wherein the data processor includes:
 a reverse gearbox connected to the light transmit-receive device, and the reverse gearbox being configured to receive a first high-speed electrical signal from the circuit board, decode the first high-speed electrical signal into a plurality of channels of first low-speed electrical signals, and the plurality of channels of first low-speed electrical signals driving the light transmit-receive device to emit the plurality of channels of first optical signals; and
 a gearbox connected to the light transmit-receive device, and the gearbox being configured to receive a plurality of channels of second low-speed electrical signals output by the light transmit-receive device, encode the plurality of channels of second low-speed electrical signals into a second high-speed electrical signal, and transmit the second high-speed electrical signal to the circuit board;
 the light transmit-receive device includes:
 a first laser array disposed on the circuit board, and the first laser array being configured to emit the plurality of channels of first optical signals driven by the plurality of channels of first low-speed electrical signals;
 a first detector array disposed on the circuit board, and the first detector array being configured to receive the plurality of channels of second optical signals from outside of the optical module, and convert the plurality of channels of second optical signals into the plurality of channels of electrical signals; and
 a first lens assembly covering the first laser array and the first detector array, and the first lens assembly being configured to change a propagation direction of optical signals incident into inside of the first lens assembly, wherein the first lens assembly includes a first optical port groove disposed on a surface of the first lens assembly away from the circuit board, and the first optical port groove has a first reflective surface and a first inclined surface; and the first inclined surface corresponds to a position of the first detector array, and the first reflective surface corresponds to a position of the first laser array, and is configured to reflect the first optical signals emitted by the first laser array;
 the optical module further comprising:
 an optical fiber adapter;
 a transmit-receive optical fiber array, one end of the transmit-receive optical fiber array being connected to the first lens assembly, and another end of the transmit-receive optical fiber array being connected to the optical fiber adapter, and the transmit-receive optical fiber array being configured to transmit the first optical signals emitted by the first laser array and the second optical signals from outside of the optical module; and
 a transmit-receive optical fiber bracket, the end of the transmit-receive optical fiber array connected to the first lens assembly being inserted into the transmit-receive optical fiber bracket and protruding from the transmit-receive optical fiber bracket, and the transmit-receive optical fiber bracket being directly connected to the first lens assembly to achieve the connection between the transmit-receive optical fiber array and the first lens assembly.

2. The optical module according to claim 1, wherein channels of electrical signals output by the reverse gearbox are twice channels of electrical signals input to the reverse gearbox, and channels of electrical signals output by the gearbox are half of channels of electrical signals input to the gearbox.

3. The optical module according to claim 1, wherein each of the first and second high-speed electrical signals is an electrical signal of 200 Gb/s, and each of the first and second low-speed electrical signals is an electrical signal of 100 Gb/s.

4. The optical module according to claim 1, wherein the first laser array includes a vertical cavity surface emitting laser (VCSEL) array.

5. The optical module according to claim 1, wherein the light transmit-receive device further includes:
   a plurality of laser driving chips disposed on the circuit board and covered by the first lens assembly, and a laser driving chip of the plurality of laser driving chips being configured to drive a corresponding laser in the first laser array to emit the first optical signals; and
   a plurality of trans-impedance amplifiers disposed on the circuit board and covered by the first lens assembly, and a trans-impedance amplifier of the plurality of trans-impedance amplifiers being configured to amplify an electrical signal converted by a corresponding detector in the first detector array.

6. The optical module according to claim 1, wherein the first lens assembly includes:
   a first groove disposed on a surface of the first lens assembly away from the circuit board, an inclined sidewall of the first groove being provided as a first reflective surface, and the first reflective surface corresponding to a position of the first laser array, and being configured to reflect the first optical signals emitted by the first laser array; and
   a second groove disposed on the surface of the first lens assembly away from the circuit board and communicating with the first groove, an inclined sidewall of the second groove being provided as a first inclined surface, and the first inclined surface corresponding to a position of the first detector array.

7. The optical module according to claim 1, wherein the first lens assembly further includes a filter; and
   the first inclined surface has a hole, and the filter is disposed in the hole and configured to transmit the first optical signals emitted by the first laser array and reflect the second optical signals from outside of the optical module.

8. The optical module according to claim 1, wherein the first inclined surface has an optical film, and is configured to transmit the first optical signals emitted by the first laser array and reflect the second optical signals from outside of the optical module.

9. The optical module according to claim 1, wherein the first lens assembly further includes a third groove disposed on a surface of the first lens assembly proximate to the circuit board, and the first laser array and the first detector array are located in a sealed cavity formed by the third groove and the circuit board.

10. The optical module according to claim 9, wherein the first lens assembly further includes:
    a first collimating lens array disposed in the third groove and corresponding to the position of the first laser array, and the first collimating lens array being configured to collimate the first optical signals emitted by the first laser array; and
    a first convergent lens array disposed in the third groove and corresponding to the position of the first detector array, and the first convergent lens array being configured to converge the second optical signals from outside the optical module.

11. The optical module according to claim 1, wherein the first lens assembly further includes:
    a fourth groove disposed on a surface of the first lens assembly proximate to the optical fiber adapter and configured to be plugged with the transmit-receive optical fiber bracket; and
    a plurality of first optical fiber sockets disposed in the fourth groove and configured to be plugged with the transmit-receive optical fiber array.

12. The optical module according to claim 11, wherein a first optical fiber socket includes a first connection hole and a second connection hole, the first connection hole communicates with the second connection hole, and the first connection hole is closer to the fourth groove than the second connection hole; and
    an inner diameter of the first connection hole is larger than an inner diameter of the second connection hole, and a dimension of the fourth groove along a direction perpendicular to the circuit board is larger than the inner diameter of the first connection hole.

13. The optical module according to claim 11, wherein the first lens assembly further includes a plurality of first lenses, and the plurality of first lenses are disposed at an end of corresponding first optical fiber sockets away from the fourth groove, and are configured to converge the first optical signals emitted by the first laser array and collimate the second optical signals from outside of the optical module.

* * * * *